United States Patent
Imaizumi et al.

(10) Patent No.: US 8,254,741 B2
(45) Date of Patent: Aug. 28, 2012

(54) OPTICAL CABLE CONNECTING CLOSURE AND OPTICAL INTERCONNECTION SYSTEM

(75) Inventors: Tsuyoshi Imaizumi, Yokohama (JP); Kenichiro Ohtsuka, Yokohama (JP); Akio Kishi, Komaki (JP); Shinya Watanabe, Komaki (JP); Akira Murozono, Komaki (JP); Tetsuya Oosugi, Komaki (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 219 days.

(21) Appl. No.: 12/530,739

(22) PCT Filed: Mar. 11, 2008

(86) PCT No.: PCT/JP2008/054336
§ 371 (c)(1),
(2), (4) Date: Sep. 10, 2009

(87) PCT Pub. No.: WO2008/111572
PCT Pub. Date: Sep. 18, 2008

(65) Prior Publication Data
US 2010/0074578 A1 Mar. 25, 2010

(30) Foreign Application Priority Data

Mar. 12, 2007 (JP) .............................. P2007-062475
Jun. 6, 2007 (JP) .............................. P2007-150223
Oct. 1, 2007 (JP) .............................. P2007-257953

(51) Int. Cl.
G02B 6/00 (2006.01)
G02B 6/28 (2006.01)
G02B 6/38 (2006.01)
G02B 6/26 (2006.01)

(52) U.S. Cl. .......... 385/135; 385/100; 385/53; 385/134; 385/24; 385/59; 385/27; 385/73

(58) Field of Classification Search .................... 385/53, 385/92, 94, 88, 89, 134, 135, 136, 137, 138, 385/139, 100, 24, 59, 27, 73
See application file for complete search history.

(56) References Cited

U.S. PATENT DOCUMENTS 6,360,050 B1 * 3/2002 Moua et al. ................... 385/135
(Continued)

FOREIGN PATENT DOCUMENTS

DE 3136738 A1 * 3/1983
(Continued)

OTHER PUBLICATIONS

International Preliminary Report on Patentability and Written Opinion of the International Searching Authority, issued in International Patent Application No. PCT/JP2008/054336, mailed Oct. 8, 2009.

*Primary Examiner* — Brian Healy
(74) *Attorney, Agent, or Firm* — McDermott Will & Emery LLP

(57) ABSTRACT

[Problem] To provide an optical cable connecting closure and optical interconnection system which can easily respond to changes in required connection functions if any.
[Solving Means] An optical cable connecting closure 118 has a case 121, while a plurality of connecting modules 123 are arranged (stored) so as to be erected with respect to the bottom face of a closure main body 119 along the width direction in a module storing section 122 of the case 121. The connecting module 123 has a rectangular parallelepiped board-like module main body 127, while a plurality of MT connectors 128, 129 are attached in a vertical row to one end face of the module main body 127. In the module main body 127, an optical connecting section 130 for connecting the MT connectors 128, 129 to each other is arranged. The module storing section 122 can store a different kind of connecting module having a connecting configuration (function) different from that of the connecting module 123.

11 Claims, 32 Drawing Sheets

U.S. PATENT DOCUMENTS

| | | | |
|---|---|---|---|
| 6,983,095 B2 * | 1/2006 | Reagan et al. | 385/135 |
| 7,139,456 B2 * | 11/2006 | Sasaki et al. | 385/114 |
| 7,200,317 B2 * | 4/2007 | Reagan et al. | 385/139 |
| 2005/0105873 A1 * | 5/2005 | Reagan et al. | 385/135 |
| 2010/0074578 A1 * | 3/2010 | Imaizumi et al. | 385/24 |

FOREIGN PATENT DOCUMENTS

| | | |
|---|---|---|
| JP | 2003-215355 | 7/2003 |
| JP | 2004-133137 | 4/2004 |
| JP | 2005-331692 | 12/2005 |
| JP | 2007-052189 | 3/2007 |
| JP | 2007-121603 | 5/2007 |

* cited by examiner

Fig.8
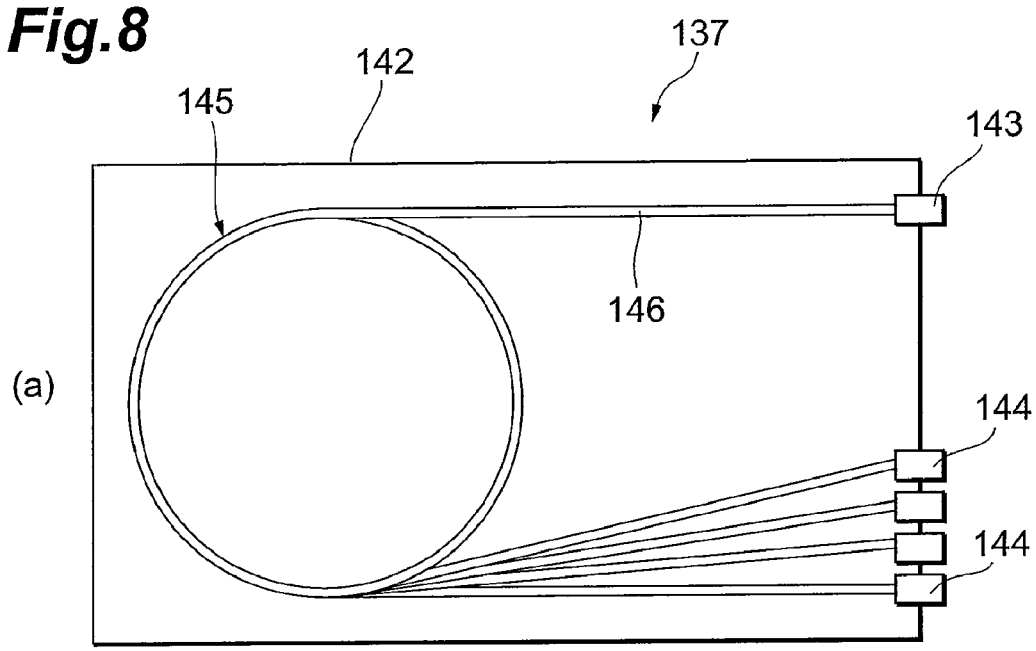
(a)
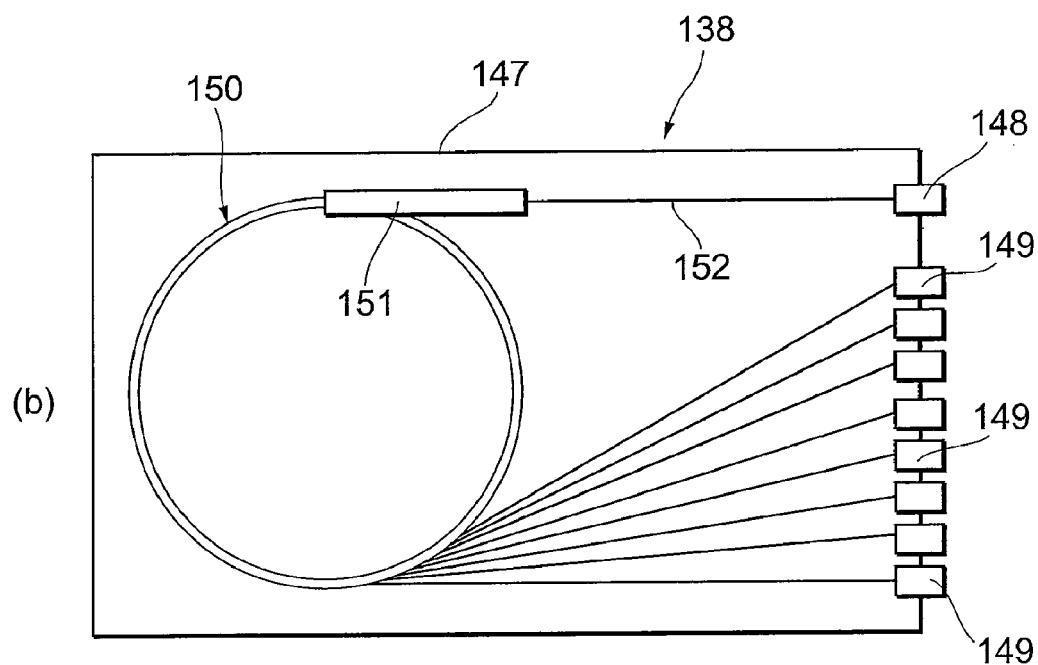
(b)

OPTICAL CABLE CONNECTING CLOSURE AND OPTICAL INTERCONNECTION SYSTEM

RELATED APPLICATIONS

This application is the U.S. National Phase under 35 U.S.C. §371 of International Application No. PCT/JP2008/054336, filed on Mar. 11, 2008, which in turn claims the benefit of Japanese Application Nos. 2007-062475, filed on Mar. 12, 2007, 2007-150223, filed on Jun. 6, 2007 and 2007-257953, filed on Oct. 1, 2007, the disclosures of which Applications are incorporated by reference herein.

TECHNICAL FIELD

The present invention relates to an optical cable connecting closure and an optical interconnection system.

BACKGROUND ART

As a conventional optical cable connecting closure, one described in Patent Literature 1 has been known, for example. The optical cable connecting closure described in Patent Literature 1 comprises a tray storing case provided within a closure main body and a tray for drop coated fibers which is constituted by stacked lower and upper trays and stored in the tray storing case so as to be freely insertable therein and removable therefrom. Each of the lower and upper trays is provided with a coated optical fiber leading-in/out section for leading coated optical fibers in and out, a connector storing section for storing a connector which connects the coated optical fibers to each other, a splitter storing section for storing an optical splitter connected to the coated optical fibers, and a coated fiber extra length storing section for storing an extra length of the coated optical fibers.

Known as an example of networks using optical fiber cables is a mode in which an optical cable is directly led into a dwelling (FTTH: Fiber To The Home). Known as an optical cable connecting closure for the FTTH is one comprising a splitter module section which optically splits a coated optical fiber or a branching coated fiber module section for multicore/single-core conversion of the coated optical fiber (see, for example, Patent Literature 2). In such an optical cable connecting closure, a first coated optical fiber in a first optical cable and a second coated optical fiber in a second optical cable are connected to a module section through a termination board.

Patent Literature 1: Japanese Patent Application Laid-Open No. 2003-215355
Patent Literature 2: Japanese Patent Application Laid-Open No. 2007-121603

DISCLOSURE OF INVENTION

Technical Problem

For utilizing conventional optical cable connecting closures such as those mentioned above, demands for enhancing their convenience have been increasing. Therefore, in view of the foregoing, it is an object of the present invention to provide an optical cable connecting closure and optical interconnection system which can enhance the convenience.

Solution to Problem

One aspect of the present invention is achieved under the following circumstances. In the FTTH, optical cable connecting closures are placed at three cable connecting points (a feeder point, a distribution point, and a drop point) between a central office and a subscriber's home in a network using an optical cable, while the optical cable is branched in each closure, so that optical cables are interconnected like a tree from the central office acting as a start point.

Prevailing in such FTTH networks is a PON (Passive Optical Network) system in which an optical splitter is placed in the central office or closure, so as to divide a single-core optical signal into 32 at the maximum and transmit thus divided signals to subscribers' homes. While the optical cable on the central office side typically incorporates therein a ribbon-coated multicore optical fiber, it is connected to subscriber's lead-in optical cables on a core-to-core basis, which makes it necessary for one of the closures to carry out single-core separation.

In view of the foregoing, connecting functions required for the optical cable connecting closures totally vary among the cable connecting points. Currently, dedicated closures having different structures conforming to respective connecting functions required at the cable connecting points are placed there. However, this is very hard to respond to changes in connecting functions required for the closure if any and thus cannot cope with modifications in the optical interconnection system which are expected in future.

It is therefore an object of one aspect of the present invention to provide an optical cable connecting closure and optical interconnection system which can easily respond to changes in required connecting functions if any.

The optical cable connecting closure for achieving the above-mentioned object comprises a case having a module storing section and a connecting module, stored in the module storing section so as to be freely insertable therein and removable therefrom, for connecting first and second optical fibers to each other; wherein the connecting module has a module main body, first and second connectors attached to the module body and respectively connected to the first and second optical fibers, and an optical connecting section, provided in the module main body, for connecting the first and second connectors to each other; and wherein the module storing section is constructed such as to be able to store a plurality of kinds of connecting modules having the same module main body structure and different connecting functions in optical connecting sections.

In such an optical cable connecting closure, a plurality of kinds of connecting modules having the same module main body structure and different connecting functions in the optical connecting sections can be stored in the module storing section in the case so as to be freely insertable therein and removable therefrom. Therefore, when a connecting function required for an optical cable connecting closure is changed, it will be sufficient if a connecting module of a kind adapted to the required connecting function is stored in the module storing section of the case in place of the existing connecting module. Since the module main body of the connecting module is provided with the first and second connectors, connector-connecting the first and second optical cables makes it easier to exchange the connecting modules. This can easily respond to changes in connecting functions required for the optical cable connecting closure.

Preferably, the optical connecting section has any of functions of straightly connecting the first and second connectors to each other, connecting the first and second connectors to each other with a core number conversion, and connecting the first and second connectors to each other with optical branching.

Thus using three kinds of connecting modules having any of straight connecting, core number converting, and optical branching functions as a connecting function of the optical connecting section makes it possible to construct a plurality of modes of optical interconnection systems between an office-side optical cable and a subscriber-side optical cable, for example.

Preferably, the first and second connectors are provided at one end part of the module main body, while the module storing section has a structure for storing the connecting module vertically with respect to the case such that the first and second connectors face the front side of the case.

In such a structure, a plurality of connecting modules can be stored while being arranged in the module storing section of the case. Therefore, in an optical interconnection system constructed between an office-side optical cable and a subscriber-side optical cable, for example, it becomes suitable for an optical cable connecting closure connected to an office-side optical cable having a large number of cores of optical fibers.

The first connector may be provided at one end part of the module main body, the second connector may be provided at the other end part of the module main body, and the module storing section may have such a structure as to store the connecting module vertically with respect to the case such that the first and second connectors face left and right sides with respect to the front side of the case.

Such a configuration can make the case attain a smaller and thinner structure when only one connecting module is stored in the module storing section of the case. Therefore, in an optical interconnection system constructed between an office-side optical cable and a subscriber-side optical cable, for example, it becomes suitable for an optical cable connecting closure connected to a subscriber-side single-core optical cable.

The present invention provides an optical interconnection system for aerial optical interconnection between an office-side optical cable and a subscriber-side optical cable, the system comprising a first optical cable connected to the office-side optical cable, a second optical cable connected to the subscriber-side optical cable, an office-side closure connecting the office-side optical cable and the first optical cable to each other, a subscriber-side closure for connecting the subscriber-side optical cable and the second optical cable to each other, and an intermediate closure for connecting the first and second optical cables to each other; wherein the office-side closure, subscriber-side closure, and intermediate closure are each constituted by the above-mentioned optical cable connecting closure and have respective kinds of connecting modules different from each other.

In such an optical interconnection system, the above-mentioned optical cable connecting closure is used as each of the office-side closure, subscriber-side closure, and intermediate closure. Therefore, it can easily respond to changes in connecting functions required for the office-side closure, subscriber-side closure, and intermediate closure if any, for example, by replacing them with kinds of connecting modules conforming to the required connecting functions.

The foregoing one aspect of the present invention can easily respond to changes in connecting functions required for optical cable connecting closures if any, without newly designing and manufacturing an optical cable connecting closure. This can fully cope with modifications in optical interconnection systems which are expected in future.

Another aspect of the present invention is achieved under the following circumstances. As mentioned above, the extra length of coated fibers tends to become longer in the conventional optical cable connecting closures, since the first and second coated optical fibers are connected to the module section through a termination board. This may make it cumbersome to handle the coated optical fibers. As the extra length of coated fibers is longer, the coated optical fibers must be handled more carefully, thereby taking a longer time, thus lowering the working efficiency in connecting or storing the coated optical fibers.

It is therefore an object of another aspect of the present invention to provide an optical cable connecting closure which can shorten the extra length of coated fibers.

The optical cable connecting closure for achieving the above-mentioned object is an optical connecting closure used for connecting a first coated optical fiber in a first optical cable and a second coated optical fiber in a second optical cable to each other, the optical cable connecting closure comprising a splitter module section for optically splitting the first coated optical fiber and connecting thus split first coated optical fiber to the second coated optical fiber or a branching coated fiber module section for multicore/single-core-converting the first coated optical fiber and connecting thus converted first coated optical fiber to the second coated optical fiber, and a main body section for storing the module section; wherein the module section is provided with a first connector for connecting with the first coated optical fiber and a second connector for connecting with the second coated optical fiber.

In this optical cable connecting closure, the first coated optical fiber is directly connected to the first connector provided in the module section, while the second coated optical fiber is directly connected to the second connector provided in the module section. This can shorten the extra length of coated fibers, since the coated optical fibers are not connected to the module section through any termination board and thus can be inhibited from increasing their extra length. As a result, it becomes easier to handle the coated optical fibers, whereby the working efficiency in their connection or storage can be improved.

Preferably, the splitter module section and branching coated fiber module section have respective outer forms identical to each other. In this case, the splitter module section and branching coated fiber module section are compatible with each other, so that one used as the branching coated fiber module section can be switched to the splitter module section for use, for example. Therefore, the coated optical fibers can freely be laid within the main body section.

Preferably, the module section is arranged so as to be stacked. In this case, the module section is favorably stored within the main body section.

Preferably, the module section is arranged so as to be rotatable about a rotary axis provided near the first connector. In this case, rotating the module section as desired can locate the second connector at a position where the second coated optical fiber is easy to attach and remove. This can improve the detachability of the second coated optical fiber.

Preferably, the optical cable connecting closure further comprises a comb-toothed guide section, provided within the main body section, for guiding the second coated optical fiber. In this case, introducing the second coated optical fiber into a groove of the comb-toothed guide section can prevent the second coated optical fiber from causing congestion.

The present invention also provides an optical cable connecting closure used for connecting a first coated optical fiber in a first optical cable and a second coated optical fiber in a second optical cable to each other, the optical cable connecting closure comprising a splitter module section for optically splitting the coated optical fiber, a branching coated fiber module section for multicore/single-core-converting the coated optical fiber, and a main body section for storing the module sections; wherein one of the splitter module section and branching coated fiber module section is provided with a first connector for connecting with the first coated optical fiber; wherein the other of the splitter module section and branching coated fiber module section is provided with a second connector for connecting with the second coated optical fiber; and wherein each of the splitter module section and branching coated fiber module section is provided with a third connector for connecting with a third coated optical fiber for connecting the splitter module section and branching coated fiber module section to each other.

In this optical cable connecting closure, the first coated optical fiber is directly connected to the first connector provided in the splitter module section, while the second coated optical fiber is directly connected to the second connector provided in the branching coated fiber module section. The third coated optical fiber is directly connected to the third connector provided in each of the module sections. This can shorten the extra length of coated fibers, since the coated optical fibers are not connected to the module section through any termination board and thus can be inhibited from increasing their extra length. Since the main body section is shared by the splitter module section and branching coated fiber module section, it is not necessary to provide two kinds of main body sections respectively corresponding to them.

The foregoing aspect of the present invention can shorten the extra length of coated fibers. As a result, it becomes easier to handle the coated optical fibers, whereby the working efficiency in their connection or storage can be improved.

ADVANTAGEOUS EFFECTS OF INVENTION

The present invention can provide an optical cable connecting closure and optical interconnection system which can enhance the convenience by making it easier to respond to changes in required connecting functions if any or shortening the extra length of coated fibers.

Description of Embodiments

In the following, preferred embodiments of the present invention will be explained in detail with reference to the drawings. In the drawings, the same or equivalent constituents will be referred to with the same signs while omitting their overlapping descriptions. Terms such as "upper" and "lower" in the following explanation are based on the states illustrated in the drawings for convenience.

[First Embodiment]

FIG. 1 is a structural view of an optical interconnection system equipped with the first embodiment of the optical cable connecting closure in accordance with the present invention. In this drawing, the optical interconnection system is a system optically interconnecting a transmission apparatus within an office to a plurality of subscribers' homes with optical cables.

The optical interconnection system 101 comprises a feeder cable 102 led from under the ground into the air, a drop cable 103 extending from each subscriber's home, branch cables 104 connected to the feeder cable 102, and a branch cable 105 connected to the drop cable 103 and branch cable 104.

As illustrated in FIG. 2, each of the feeder cable 102 and branch cable 104 has a spacer 107 provided with a tension member 106 at a center part thereof, while the spacer 107 is formed with a plurality of (5 here) helical grooves (slots) 108. A plurality of (5 here) 4-core coated optical fiber ribbons (hereinafter simply referred to as 4-core coated fiber ribbons) 109 are arranged within each slot 108. The spacer 107 is covered with a cable jacket 110 formed from polyethylene (PE) or the like.

As illustrated in FIG. 3, the drop cable 103 has a support wire 111, a single-core coated optical fiber 112, and a pair of tension members 113 arranged on both sides of the coated optical fiber 112. The support wire 111, coated optical fiber 112, and each of tension members 113 are collectively covered with a sheath 114 made of PE or the like.

As illustrated in FIG. 4, the branch cable 105 comprises a plurality of (8 here) single-core coated optical fibers 115 and a pair of tension members 116 arranged on both sides of the coated optical fibers 115. The coated optical fibers 115 are arranged in two tiers. Each of the coated optical fibers 115 and tension members 116 are collectively covered with a sheath 117 made of PE or the like.

The feeder cable 102 and branch cables 104 are connected together through a feeder closure 118 at a feeder point. The feeder point is a point where an optical cable emerges from under the ground into the air.

As illustrated in FIG. 5, the feeder closure 118 has a case 121 constituted by a box-shaped closure main body 119 and a door 120. The door 120 is rotatably supported by a lower end part of the closure main body 119, so as to be able to open and close the closure main body 119. The closure main body 119 has a module storing section 122. In the module storing section 122, a plurality of connecting modules 123 are arranged along a width direction (lateral direction) while being erected (in a vertically placed state) with respect to the bottom face of the closure main body 119.

Specifically, a storage rack of a front draw type (not depicted) is arranged in the module storing section 122. Each of the connecting modules 123 are stored in the storage rack so as to be freely inserted therein and removed therefrom through the front side (door 120 side). When stored in the storage rack, the connecting modules 123 are secured to the storage rack through fixing means such as a screw or hot-plug board, for example.

One end part of the closure main body 119 is provided with a cable introducing section 124 having an inlet for introducing the 4-core coated fiber ribbons 109 taken out by removing the cable jacket 110 from an end part of the feeder cable 102. The other end part of the closure main body 119 is provided with a cable introducing section 125 having an inlet for introducing the 4-core coated fiber ribbons 109 taken out by removing the cable jacket 110 from an end part of the branch cable 104. Though the case 121 is formed from a plastic or the like, the cable introducing sections 124, 125 are formed from a rubber or the like so as to secure sealability and waterproofness.

The back face of the closure main body 119 is provided with two attachments 126 for allowing an aerial messenger wire (not depicted) to hold and secure the feeder closure 118. An L-shaped plate and a flat plate which hold the messenger wire are fastened together with the attachments 126 by screws, for example, whereby the feeder closure 118 is attached to the messenger wire.

As illustrated in FIGS. 5 and 6, each connecting module 123 has a rectangular parallelepiped board-like module main body 127, while a plurality of (5 each here) 4-core MT connectors 128, 129 are attached respectively in a vertical row to one end face of the module main body 127.

An optical connecting section 130 for connecting the MT connectors 128, 129 to each other are arranged within the module main body 127. The optical connecting section 130 functions to straightly connect each pair of MT connectors 128, 129 to each other through an optical fiber 131.

Each connecting module 123 is stored in the module storing section 122 such that the MT connectors 128, 129 face the front side of the case 120. The 4-core coated fiber ribbons 109 of the feeder cable 102 are connector-connected to the MT connectors 128, while the 4-core coated fiber ribbons 109 of the branch cable 104 are connector-connected to the MT connectors 129. As a consequence, the 4-core coated fiber ribbons 109 of the feeder cable 102 and the 4-core coated fiber ribbons 109 of the branch cable 104 are connected together through the connecting module 123.

The branch cables 104, 105 are branch-connected to each other through a distribution closure 132 at a distribution point.

As illustrated in FIG. 7, the distribution closure 132 has a case 135 constituted by a box-shaped closure main body 133 and a door 134. The case 135 has the same structure as that of the case 120 of the above-mentioned feeder closure 118. The closure main body 133 has a module storing section 136, in which a connecting module 137 and a plurality of connecting modules 138 are arranged along the width direction while being erected with respect to the bottom face of the closure main body 133. The structure for storing the connecting modules 137, 138 in the module storing section 136 is totally the same as the structure for storing the connecting modules 123 in the above-mentioned module storing section 122.

One end part of the closure main body 133 is provided with a cable introducing section 139 having an inlet for introducing the 4-core coated fiber ribbons 109 taken out by removing the cable jacket 110 from a middle part of the branch cable 104. The other end part of the closure main body 133 is provided with a cable introducing section 140 having an inlet for introducing eight single-core coated optical fibers 115 taken out by removing the sheath 117 from an end part of the branch cable 105. Though not illustrated in FIG. 7, the branch cable 104 passes through the closure main body 133 via the cable introducing sections 139, 140 (see FIG. 1). The cable introducing sections 139, 140 are formed from a rubber or the like as with the above-mentioned cable introducing sections 124, 125.

The back face of the closure main body 133 is provided with two attachments 141 for allowing a messenger wire (not depicted) to hold and secure the distribution closure 132. The structure of the attachments 141 is the same as that of the above-mentioned attachments 126.

As illustrated in FIGS. 7 and 8(a), the connecting module 137 has a module main body 142. The module main body 142 has the same structure and dimensions as those of the module main body 127 of the above-mentioned connecting module 123. A 4-core MT connector 143 and a plurality of (4 here) single-core connectors 144 are attached in a vertical row to one end face of the module main body 142. An SC connector or FAS connector, for example, is used as the single-core connector 144.

An optical connecting section 145 for connecting the MT connector 143 to each of the single-core connectors 144 is arranged within the module main body 142. The optical connecting section 145 functions to connect the MT connector 143 to each of the single-core connectors 144 with 4-core/single-core conversion (core number conversion) through the optical fiber 146.

As illustrated in FIGS. 7 and 8(b), each connecting module 138 has a module main body 147 with the same structure and dimensions as those of the above-mentioned module main body 142. A single-core connector 148 and a plurality of (8 here) single-core connectors 149 are attached in a vertical row to one end face of each module main body 147. As the single-core connectors 148, 149, those identical to the above-mentioned single-core connectors 144 are used.

An optical connecting section 150 for connecting the single-core connector 148 to each of the single-core connectors 149 is arranged within the module main body 147. The optical connecting section 150 includes an optical splitter (optical branching device) 151 for splitting one optical input into a plurality of (8 here) outputs and functions to connect the single-core connector 148 to each of the single-core connectors 149 with optical branching through the optical fiber 152.

The connecting module 137 is stored in the module storing section 136 such that the MT connector 143 and single-core connectors 144 face the front side of the case 135, while each connecting module 138 is stored in the module storing section 136 such that the single-core connectors 148, 149 face the front side of the case 135. The 4-core coated fiber ribbon 109 of the branch cable 104 is connector-connected to the MT connector 143, while each of the coated optical fibers 115 of the branch cable 105 are connector-connected to the respective single-core connectors 149. The single-core connectors 144, 148 are connector-connected to each other through a connecting optical fiber 153. As a consequence, the 4-core coated fiber ribbon 109 of the branch cable 104 and each coated optical fiber 115 of the branch cable 105 are connected to each other through the connecting module 137, connecting optical fiber 153, and connecting module 138.

The branch cable 105 and drop cable 103 are branch-connected to each other through a drop closure 154 at a drop point.

As illustrated in FIG. 9, the drop closure 154 has a case 157 constituted by a box-shaped closure main body 155 and a door 156. The door 156 is rotatably supported by a lower end part of the closure main body 155, so as to be able to open and close the closure main body 155. The case 157 is smaller and thinner than the case 121 of the feeder closure 118.

The closure main body 155 has a module storing section 159 for storing one connecting module 158 in a freely insertable and removable manner. With fastening means such as a screw or hook, for example, the connecting module 158 is attached to a rear inner face 155a of the closure main body 155 as being erected (in a vertically placed state) with respect to the bottom face of the closure main body 155.

One end part of the closure main body 155 is provided with a cable introducing section 160 having an inlet for introducing each of the coated optical fibers 115 taken out by removing the sheath 117 from a middle part of the branch cable 105. The other end part of the closure main body 155 is provided with a cable introducing section 161 having an inlet for introducing the drop cable 103. Though not illustrated in FIG. 9, the branch cable 105 passes through the closure main body 155 via the cable introducing sections 160, 161 (see FIG. 1). The cable introducing sections 160, 161 are formed from a rubber or the like as with the above-mentioned cable introducing sections 124, 125.

The back face of the closure main body 155 is provided with attachment 162 for allowing a messenger wire (not depicted) to hold and secure the drop closure 154. The structure of the attachments 162 is the same as that of the above-mentioned attachments 126.

As illustrated in FIGS. 9 and 10, the connecting module 158 has a module main body 163. The module main body 163 has totally the same structure and dimensions as those of the module main body 127 of the above-mentioned connecting module 123. A single-core connector 164 is attached to one end face of the module main body 163, while a single-core connector 165 is attached to the other end face of the module main body 163. As the single-core connectors 164, 165, those identical to the above-mentioned single-core connectors 144 are used.

An optical connecting section 167 functioning to straightly connect the single-core connectors 164, 165 to each other through an optical fiber 166 is arranged within the module main body 163.

The connecting module 158 is stored in the module storing section 159 such that the single-core connectors 164, 165 face the left and right sides with respect to the front side of the case 157. The coated optical fiber 115 of the branch cable 105 is connector-connected to the single-core connector 164, while the single-core drop cable 103 is connector-connected to the single-core connector 165. As a consequence, the coated optical fiber 115 of the branch cable 105 and the drop cable 103 are connected to each other through the connecting module 158.

Since the cable connecting portions of the feeder closure 118, distribution closure 132, and drop closure 154 are modular and have connector-connectable structures in the foregoing optical interconnection system 101, it becomes easy to carry out cable connecting operations, whereby the operation time can be shortened.

[Second Embodiment]

FIG. 11 is a structural view of another optical interconnection system equipped with the second embodiment of the optical cable connecting closure in accordance with the present invention. In this drawing, the members identical to those in the optical interconnection system illustrated in FIG. 1 will be referred to with the same signs while omitting their explanations.

In the optical interconnection system 170 illustrated in FIG. 11, a feeder cable 102 and a branch cable 104 are connected to each other through a feeder closure 171 at a feeder point.

As illustrated in FIG. 12, the feeder closure 171 has a case 121 similar to that of the above-mentioned feeder closure 118, while a plurality of connecting modules 172 are arranged along the width direction as being erected with respect to the bottom face of a closure main body 119.

As illustrated in FIGS. 12 and 13, each connecting module 172 has a module main body 173 having the same structure and dimensions as those of the above-mentioned connecting module 123. A 4-core MT connector 174 and a plurality of (8 here) 4-core MT connectors 175 are attached in a vertical row to one end face of the module main body 173.

An optical connecting section 176 for connecting the MT connectors 174, 175 together is arranged within the module main body 173. The optical connecting section 176 includes four optical splitters 151 (mentioned above) and functions to connect the MT connectors 174, 175 together with optical branching and consolidating through optical fibers 177.

Each connecting module 172 is stored in the module storing section 122 such that the MT connectors 174, 175 face the front side of the case 120. The 4-core coated fiber ribbon 109 of the feeder cable 102 is connector-connected to the MT connector 174, while the 4-core coated fiber ribbons 109 of the branch cable 104 are connector-connected to the respective MT connectors 175. As a consequence, the 4-core coated fiber ribbon 109 of the feeder cable 102 and the 4-core coated fiber ribbons 109 of the branch cable 104 are connected to each other through the connecting module 172.

The branch cables 104, 105 are branch-connected to each other through a distribution closure 178 at a distribution point.

As illustrated in FIG. 14, the distribution closure 178 has a case 135 similar to that of the above-mentioned distribution closure 132, while a plurality of connecting modules 137 (see FIG. 8(a)) are arranged along the width direction of the module storing section 136 of the case 135 as being erected with respect to the bottom face of the closure main body 133.

Each connecting modules 137 is stored in the module storing section 136 such that the 4-core MT connectors 143 and single-core connectors 144 face the front side of the case 135. The 4-core coated fiber ribbon 109 is connector-connected to the MT connector 143, while the coated optical fibers 115 of the branch cable 105 are connector-connected to the respective single-core connectors 144. As a consequence, the 4-core coated fiber ribbon 109 and each coated optical fiber 115 of the branch cable 105 are connected to each other through the connecting module 137.

The branch cable 105 and drop cable 103 are branch-connected to each other through a drop closure 154 at a drop point as in the optical interconnection system 101 illustrated in FIG. 1.

Since the feeder closure 171 is provided with the connector module 172 having an optical branching function, the optical interconnection system 170 can increase the number of branch cables 104 connected to the feeder closure and the number of subscribers connected to an office, thereby enhancing the use efficiency of the system.

[Third Embodiment]

FIG. 15 is a structural view of still another optical interconnection system equipped with the third embodiment of the optical cable connecting closure in accordance with the present invention. In this drawing, the members identical to those in the optical interconnection systems illustrated in FIGS. 1 and 11 will be referred to with the same signs while omitting their explanations.

In the optical interconnection system 180 illustrated in FIG. 15, a feeder cable 102 and a branch cable 104 are connected to each other through the feeder closure 118 at a feeder point as in the optical interconnection system 101 illustrated in FIG. 1. The branch cables 104, 105 are branch-connected through the distribution closure 178 at a distribution point as in the optical interconnection system 170 illustrated in FIG. 11.

The branch cable 105 and drop cable 103 are branch-connected to each other through a drop closure 181 at a drop point.

As illustrated in FIG. 16, the drop closure 181 has a case 157 similar to that of the above-mentioned drop closure 154; one connecting module 182 is stored in the module storing section 159 of the case 157 while being erected with respect to the bottom face of the closure main body 155. The structure for storing the connecting module 182 in the module storing section 159 is totally the same as the structure for storing the connecting module 158 mentioned above.

As illustrated in FIGS. 16 and 17, the connecting module 182 has a module main body 183 with the same structure and dimensions as those of the above-mentioned connecting module 158. A single-core connector 184 is attached to one end face of the module main body 183, while a plurality of (8 here) single-core connectors 185 are attached to the other end face of the module main body 183.

An optical connecting section 186 for connecting the single-core connectors 184, 185 to each other is arranged within the module main body 183. The optical connecting section 186 includes an optical splitter 151 (mentioned above) and connects the single-core connectors 184, 185 to each other with optical branching through optical fibers 187.

The connecting module 182 may be made as a dedicated module separate from the above-mentioned connecting module 158, or the single-core connector 184 may be made selectively attachable to both end parts of the module main body 183, so as to be also usable as the above-mentioned connecting module 158.

The connecting module 182 is stored in the module storing section 159 such that the single-core connectors 184, 185 face the left and right sides with respect to the front side of the case 157. The coated optical fiber 115 of the branch cable 105 is connector-connected to the single-core connector 184, while the single-core drop cable 103 is connector-connected to each single-core connector 185. As a consequence, the coated optical fiber 115 of the branch cable 105 and the drop cable 103 are connected to each other through the connecting module 182.

Since the drop closure 181 is provided with the connecting module 182 having an optical branching function in the optical interconnection system 180, the system can effectively be utilized without unnecessarily increasing the number of branch cables 104, 105 in areas where many subscribers' homes are densely packed.

As in the foregoing, a plurality of kinds of connecting modules 123, 137, 138, 158, 172, 182 which are different from each other in terms of modes (functions) of connecting optical connectors to each other in the first to third embodiments have module main bodies with the same structure and dimensions. Also, the module storing sections of the cases in the feeder and distribution closures have the same structure. Therefore, the connecting modules 123, 137, 138, 172 can be used for any of the feeder and distribution closures, while the connecting modules 158, 182 can be used for the drop closure. Hence, even when the optical interconnection system is changed, it is unnecessary to design and manufacture the feeder and distribution closures from scratch in conformity to required connecting functions.

Specifically, when changing the optical interconnection system illustrated in FIG. 1 to that illustrated in FIG. 11, the 4-core coated fiber ribbons 109 of the feeder cable 102 and the 4-core coated fiber ribbons 109 of the branch cable 104 are removed from the connecting module 123 while the door 120 of the feeder closure 118 is open, and then the connecting module 123 is pulled out of the case 121. Then, another connecting module 172 is stored into the module storing section 122 of the case 121, and the 4-core coated fiber ribbon 109 of the feeder cable 102 and the 4-core coated fiber ribbons 109 of the branch cable 104 are connector-connected to the connecting module 172. This constructs the feeder closure 171 illustrated in FIG. 12.

While the door 134 of the distribution closure 132 is open, each coated optical fiber 115 of the branch cable 105 is removed from the connecting module 138, the connecting optical fiber 105 is removed from the connecting modules 137, 138, and then the connecting module 138 is pulled out of the case 135. Thereafter, each coated optical fiber 115 of the branch cable 105 is connector-connected to the connecting module 137. This constructs the distribution closure 178 illustrated in FIG. 14.

Similarly, when changing the optical interconnection system illustrated in FIG. 1 to that illustrated in FIG. 15, the connecting module 138 is pulled out of the case 135 of the distribution closure 132, and each coated optical fiber 115 of the branch cable 105 is connector-connected to the connecting module 137, so as to construct the distribution closure 178 illustrated in FIG. 14.

While the door 156 of the drop closure 154 is open, the coated optical fiber 115 of the branch cable 105 and the drop cable 103 are removed from the connecting module 158, and then the connecting module 158 is pulled out of the case 157. Thereafter, another connecting module 182 is stored into the module storing section 159 of the case 157, and the coated optical fiber 115 of the branch cable 105 and the drop cables 103 are connector-connected to the connecting module 182. This constructs the drop closure 181 illustrated in FIG. 16.

Thus, when connecting functions required for the distribution and drop closures are changed, it will be sufficient if other kinds of connecting modules conforming to the changed requirements replace old ones or such kinds of connecting modules are left as they are in a plurality of kinds of connecting modules stored in the case. This can easily cope with future changes in optical interconnection systems.

The present invention is not limited to the above-mentioned first to third embodiments. For example, though the above-mentioned first to third embodiments relate to optical interconnection systems constructed between a transmission apparatus within an office and a plurality of subscribers' homes, the optical cable connecting closure of the present invention is also applicable to other modes of optical interconnection systems as a matter of course.

[Fourth Embodiment]

The optical cable connecting closure in accordance with the fourth embodiment of the present invention will now be explained. FIG. 18 is a broken perspective view illustrating the optical cable connecting closure in accordance with the fourth embodiment of the present invention, while FIG. 19 is a perspective view illustrating a splitter module section in the optical cable connecting closure of FIG. 18. As illustrated in FIG. 18, the optical cable connecting closure 201 is used for connecting optical cables. Here, the optical cable connecting closure 201 interconnects a main cable (first optical cable) T0 for delivering communication information of the Internet and the like with a branch cable (second optical cable) T1 having a coated optical fiber of several to several ten cores and existing near a dwelling. The optical cable connecting closure 201 has a main body section 202, a plurality of splitter module sections 203, and a guide section 204.

The main body section 202, which constructs the outer circumference of the optical cable connecting closure 201, is shaped like an elongated box. The main body section 202 is hermetically sealable with a lid (not depicted) and stores therein the splitter module sections 203 and guide section 204. The main cable T0 passes through the upper part of the main body section 202 along a longitudinal direction (hereinafter referred to as "front-to-back direction"). The branch cable T1 is connected to the rear end part (depicted right side) of the main body section 202.

Each splitter module section 203 optically splits a coated optical fiber (first coated optical fiber) 206 of the main cable T0 and connects thus obtained branches to coated optical fibers (second coated optical fibers) 208 of the branch cable T1. The splitter module section 203, which is of a plate-shaped cassette type, is constructed such as to have an optical waveguide therewithin, for example. When seen in the thickness direction, the splitter module section 203 has a rectangular form which is elongated in the front-to-back direction.

Specifically, as illustrated in FIG. 19, the splitter module section 203 is formed like a rectangle having cut off one corner portion, so that a tilted surface 203e inclined with respect to the longitudinal direction is formed on the outer peripheral face. More specifically, the outer peripheral face of the splitter module section 203 comprises end faces 203a, 203b which are perpendicular to the longitudinal direction, side faces 203c, 203d which are parallel to the longitudinal direction, and the tilted surface 203e, and is constructed such that the side face 203c continues with the end faces 203a, 203b on one end side thereof, the tilted surface 203e continues with the end face 203a on the other end side, and the side face 203d continues with the tilted surface 203e and end face 203b.

The tilted surface 203e of the splitter module section 203 is provided with an input connector (first connector) 205 to which the coated optical fiber 206 of the main cable T0 is connected. As the coated optical fiber 206, a 4-core coated fiber ribbon is used. As the input connector 205, a multicore fiber connecting MT (Mechanically Transferable) connector is used, for example.

The end face 203b of the splitter module section 203 is provided with a plurality of output connectors (second connectors) 207 to which the coated optical fibers 208 of the branch cable T1 are connected. Here, four output connectors 207 are arranged in a row along the width direction of the splitter module section 203. Each of the output connectors 207 is connectable to two coated optical fibers 208. Hence, eight coated optical fibers 208 can be connected to the splitter module section 203. As the coated optical fiber 208, a 4-core coated fiber ribbon is used. For example, a multicore fiber connecting MT connector is used as the output connector 207. The coated optical fiber 208 is protected by an ID tube (not depicted) for identifying and protecting the coated optical fiber.

An engagement groove 209 for engaging a rotary shaft G is provided in the side face 203c of the splitter module section 203 at an end part nearer to the input connector 205.

Returning to FIG. 18, the splitter module sections 203 are arranged within the main body section 202 such that the input connectors 205 are positioned on the front side (the output connectors 207 are on the rear side). Six splitter module sections 203 are stacked in a vertical row, while their engagement grooves 209 engage the rotary shaft G (see FIG. 19) passing therethrough. This makes each splitter module section 203 rotatable by a predetermined angular range (range of 0° to 90° here) in directions of arrow a. Hence, the splitter module sections 203 are constructed such as to be rotatable about the axis of the rotary shaft G provided near the input connectors 205.

The guide section 204, which is used for guiding the coated optical fibers 208, is provided behind the splitter module sections 203 within the main body section 202. The guide section 204 has comb-toothed pieces 204a, each extending in the width direction of the main body section 202, arranged in a vertical row. Hence, the guide section 204 is shaped like comb teeth.

Specifically, the comb-toothed pieces 204a are arranged in a vertical row with predetermined intervals corresponding to the respective thicknesses of the stacked splitter modules 203. This allows the coated optical fibers 208 connected to each splitter module 203 to advance through their corresponding gap between the comb-toothed pieces 204a, thereby preventing the coated optical fibers 208 from causing congestion.

In an optical cable connecting closure in the conventional FTTH, the main body section 202 typically stores therein a fusion welding section (termination board or the like), through which the coated optical fibers 206, 208 are connected to the splitter module sections 203. Therefore, an extra coated fiber length of about 1 m is necessary for fusion splicing within the main body section 202 from the viewpoint of estimating 5 to 10 times of splicing failures and securing the working distance to a fusion splicer. This increases the extra length of coated optical fibers, thereby making it cumbersome to handle the coated optical fibers.

As the extra length of coated optical fibers is longer, the storage time for storing (accommodating) the coated optical fibers 206, 208 in the main body section 202 increases. A splicing time of about 3 to 5 min is necessary for splicing by the fusion splicer. Therefore, fear of causing troubles becomes remarkable in an operation for opening an optical line having an enormous number of coated fibers.

In the optical cable connecting closure 201 of the fourth embodiment, by contrast, the coated optical fibers 206 are directly connected to the input connectors 205, while the coated optical fibers 208 are directly connected to the output connectors 207, so that the coated optical fibers 206, 208 can be restrained from increasing their extra length, whereby the extra length of coated fibers can be shortened. As a result, it becomes easier to handle the coated optical fibers 206, 208, whereby the working efficiency in connecting or storing the coated optical fibers 206, 208 can be improved. Further, it reduces cumbersome operations such as the processing of the extra length of coated fibers, thereby making it possible to inhibit the quality from being adversely affected by contact with the coated optical fibers 206, 208 and shorten the operation time.

In the optical cable connecting closure 201, the splitter module sections 203 are constructed such as to be rotatable about the rotary axis G provided near the input connectors 205 as mentioned above. Therefore, the splitter module sections 203 can be rotated as desired when attaching/removing the coated optical fibers 208 to/from the output connectors 207, so as to locate the output connectors 207 at positions where the coated optical fibers 208 are easy to attach/remove. As a result, the detachability of the coated optical fibers 208 can be improved.

When storing the coated optical fibers 208 after attaching and removing them, the positions of the splitter module sections 203 can be rotated again, so as to store the coated optical fibers 208 with a high density within the main body section 202. Since each splitter module 203 is provided with a plurality of output connectors 207 to which the coated optical fibers 208 are connected, the effect of improving the detachability of the coated optical fibers 208 is effective in particular.

In the optical cable connecting closure 201, the splitter module sections 203 are arranged so as to be stacked within the main body section 202 as mentioned above and thus can favorably be stored in a smaller space within the main body section 202.

Since the optical cable connecting closure 201 is equipped with the guide section 204 formed like comb teeth, the coated optical fibers 208 can advance through gaps (groove parts) between its comb-toothed pieces 204a, thereby preventing the coated optical fibers 208 from causing congestion, and smoothly follow movements of the splitter module sections 203. Since the comb-toothed pieces 204a are placed at predetermined intervals corresponding to the respective thicknesses of the stacked splitter module sections 203, the coated optical fibers 208 can be divided into the respective groups connected to the splitter module sections 203.

In the optical cable connecting closure 201, the splitter module sections 203 can be attached to or removed from the main body section 202 by inserting or removing the connectors 205, 207 and thus can easily be replaced easily with splitter module sections having different functions, for example. As a result, in the case where a nearby wiring network is changed after installing the optical cable connecting closure 201, for example, functions of module sections can easily be replaced partly, whereby it becomes unnecessary to newly provide another closure.

Since the input connector 205 is provided on the tilted surface 203e in the splitter module section 203 as mentioned above, the coated optical fiber 206 can easily be connected to the input connector 205. Since the input connector 205 is positioned on the front side of the main body section 202, while the output connectors 207 are positioned on the rear side, the coated optical fibers 206, 208 within the main body section 202 are further prevented from causing congestion.

[Fifth Embodiment]

The optical cable connecting closure 210 in accordance with the fifth embodiment of the present invention will now be explained. In the following explanations, differences from the above-mentioned fourth embodiment will mainly be set forth while omitting descriptions similar thereto.

FIG. 20 is a broken perspective view illustrating the optical cable connecting closure in accordance with the fifth embodiment of the present invention. As illustrated in FIG. 20, the optical cable connecting closure 210 interconnects a main cable T0 with a branch cable (second optical cable) T2 constituted by a plurality of drop cables (second coated optical fibers) 218. Each drop cable 218 is a single-core coated optical fiber, which is often used for leading a coated optical fiber into a dwelling. The optical cable connecting closure 210 differs from the above-mentioned optical cable connecting closure 201 in that branching coated fiber module sections 213 are provided in place of the splitter module sections 203.

The branching coated fiber module sections 213 connect the coated optical fibers 206 of the main cable T0 to the drop cables 218 of the branch cable T2 through multicore/single-core conversion. The branching coated fiber module sections 213 have outer forms similar to those of the above-mentioned splitter module sections 203. A plurality of output connectors (second connectors) 217 are provided at the rear end face 213b of each branching coated fiber module section 213. Here, four output connectors are arranged in a row along the width direction of the branching coated fiber module section 213. As the output connector 217, a sheath holding connector is used.

This optical cable connecting closure 210 also yields an effect similar to that of the above-mentioned optical cable connecting closure 201, i.e., the effect that the coated fiber extra length can be shortened.

Since the above-mentioned splitter module section 203 and branching coated fiber module section 213 have outer forms identical to each other, the module sections 203, 213 are compatible with each other, whereby one used as the branching coated fiber module section 213 may be exchanged for the splitter module section 203 or vice versa, for example. Therefore, the coated optical fibers 206, 208, 218 can be interconnected freely within the main body section 202.

Since the sheath holding connector is used as the output connected 217 as mentioned above, the drop cable 218 can directly be connected to the output connector 217 in a favorable manner. That is, even the drop cables 218 laid aerially within the main body section 202 can be prevented from being contacted and causing quality failures.

Though preferred embodiments of the present invention are explained in the foregoing, the present invention is not limited to the above-mentioned fourth and fifth embodiments. For example, the optical cable connecting closure may have both of the splitter module section 203 and branching coated fiber module section 213.

Specifically, as illustrated in FIG. 21(a), an optical cable connecting closure 230 may comprise module sections 203, 213. The module sections 203, 213 are provided within the main body section 202 so as to be stacked in a vertical row. Specifically, three splitter module sections 203 are stacked on the upper side of three branching coated fiber module sections 213. In this optical cable connecting closure 230, a coated optical fiber 208 connected to an output connector 207 of a splitter module section 203 is connected to an input connector 205 of a branching coated fiber module section 213. Hence, the coated optical fiber 208 constitutes a third coated optical fiber, while the output connector 207 of the splitter module section 203 and the input connector 205 of the branching coated fiber module section 213 constitute third connectors.

As illustrated in FIG. 21(b), an optical cable connecting closure 240 may comprise splitter module sections 203 stacked in a vertical row on the front side of the main body section 202 and branching coated fiber module sections 213 stacked in a vertical row on the rear side of the main body section 202. In this optical cable connecting closure 240, respective guide sections 204 are provided behind the module sections 203, 213. In this optical cable connecting closure 240, a coated optical fibers 208 connected to an output connector 207 of a splitter module section 203 is connected to an input connector 205 of a branching coated fiber module section 213. Hence, the coated optical fiber 208 constitutes a third coated optical fiber, while the output connector 207 of the splitter module section 203 and the input connector 205 of the branching coated fiber module section 213 constitute third connectors.

In these optical cable connecting closures 230, 240, a coated optical fiber 206 is directly connected to an input connector 205 of a splitter module section 203, while a drop cable 218 is directly connected to an output connector 217 of a branching coated fiber module section 213. The coated optical fiber 208 is directly connected to an output connector 207 of the splitter module section 203 and the input connector 205 of the branching coated fiber module section 213. This yields the effect of making it possible to shorten the coated fiber extra length as with the above.

Since the main body section 202 is shared by the splitter module sections 203 and branching coated fiber module sections 213, it is not necessary to provide two kinds of main body sections 202 corresponding to them in the optical cable connecting closures 230, 240.

In the optical cable connecting closures 230, 240, a coated optical fiber 206 may be connected to an input connector 205 of the branching coated fiber module section 213, a drop cable 218 may be connected to an output connector 207 of a splitter module section 203, and a coated optical fiber 208 may be connected to an output connector 217 of the branching coated fiber module section 213 and an input connector 205 of the splitter module section 203. In this case, the coated optical fiber 208 constitutes a third coated optical fiber, while the input connector 205 of the splitter module section 203 and the output connector 217 of the branching coated fiber module section 213 constitute third connectors.

[Sixth Embodiment]

The sixth embodiment of the present invention will now be explained. The sixth embodiment of the present invention relates to a terminating structure for an aggregate drop cable in which a plurality of drop cables are stranded together and a closure employing this structure.

First, the background art in the sixth embodiment of the present invention will be explained. Known as a method of constructing a network by optical fiber cables is one installing closures for storing connecting sections of optical fibers in three stages of a feeder point, a distribution point, and a division point from a base station to a subscriber's home and selectively storing optical fiber cables in the respective closures at the installation points in order to attain rational connections in the respective stages.

For example, a multicore slotted ribbon cable is typically stored as a branch line in a closure at the feeder point positioned on the base station side. A closure at the division point containing a drop line to a subscriber's home stores an appropriate number of drop cables each including a single- or 2-core optical fiber as the drop line. On the other hand, in order to save labor of wiring drop lines, it has been becoming widespread to utilize an aggregate drop cable having a structure in which a plurality of drop cables are stranded together as a sub-branch line in optical fiber cables for connecting the closure at the distribution point to the closure at the division point.

FIGS. 28 and 29 illustrate structural examples of aggregate drop cables used as a sub-branch line between a distribution point and a drop point. The aggregate drop cable 311 illustrated in FIG. 28 has a structure in which four single-core cables 313 (single-core elements) are stranded about a support wire 312. Each single-core drop cable 313 has a structure in which one optical fiber 314 and two tension members 315 flanking the optical fiber 314 on both sides are covered with a coating 316. The aggregate drop cable 317 illustrated in FIG. 29 has a structure in which a circular bundle constituted by a greater number of single-core drop cables 313 stranded together is longitudinally supported by a support wire 318, while a bind wire 319 binds the bundle of single-core drop cables 313 and the support wire 318 together.

When introducing/removing such drop cable 311 or 317 into/from a closure, the stranded single-core drop cables 313 have conventionally been untied, so as to be inserted or held one by one at a cable leading-in/out section of the closure.

FIG. 30 illustrates the structure of a cable leading-in/out section at an end part of a conventional closure. The cable leading-in/out section 341 illustrated here, which is disclosed in Japanese Patent Application Laid-Open No. 2005-295749, is constituted by a sealing end face plate 371 for hermetically closing an opening part at each end of a cylindrical case of the closure, and a cable holding device 373 provided near the end face plate 371 within the case main body of the closure.

As also illustrated in FIG. 31, the end face plate 371 is formed with a cable inserting section 363 for inserting a main cable 303 therethrough, two cable inserting sections 365 for inserting branch cables 305 therethrough, and a plurality of cable inserting sections 367 for inserting respective drop cables 307 therethrough. Each of the cable inserting sections 363, 365 is constructed so as to be able to open by being divided into two as illustrated in FIG. 32 in order for cables to be simply inserted therethrough by wedging.

As illustrated in FIG. 30, the cable holding device 373 is constituted by a device main body 374 secured to the case main body of the closure, insert nuts 343 screwed to the device main body 374 in order to hold the cables 303, 305, and position regulating plates 375 secured to the device main body 374 in order to hold the drop cables 307.

A pair of insert nuts 343 are arranged at each of positions corresponding to the cable inserting sections 363, 365, 365 and hold the cable 303, 305 inserted through the cable inserting section 363, 365, 365 with a pair of insert clasps.

Each of the position regulating plates 375, which is a resin molded product, is formed with a plurality of cable holding grooves 389, at predetermined intervals, for holding the drop cables 307 and keeps a plurality of drop cables 307 in an aligned state by individually wedging the drop cables 307 inserted through the cable inserting sections 367 into the respective cable holding grooves 389 one by one.

A problem of the above-mentioned background art and an object of the sixth embodiment will now be explained. The operation of untying the single-core drop cables 313 constituting the aggregate drop cables 311, 317 illustrated in FIGS. 28 and 29, inserting them one by one through the cable inserting sections 367 of the sealing end face plate 371 illustrated in FIG. 30, and wedging them into the cable holding grooves 389 for drop cables in the cable holding device 373 one by one, for example, takes much labor, thereby consuming time.

Besides, the number of cable inserting sections 367 or cable holding grooves 389 for drop cables provided in the cable leading-in/out section 341 in the existing closure is about 12 to 16 at the maximum, so that a multistart aggregate drop cable 317 in which 16 or more drop cables are stranded cannot be stored in the existing closure 351.

The object of the sixth embodiment of the present invention is to overcome the problem mentioned above and provide a terminating structure for an aggregate drop cable which makes it unnecessary to insert drop cables one by one through the cable inserting sections or holding grooves for drop cables when leading the aggregate drop cables into and out of the closure, so as to be able to improve the workability, and allows the existing closure to store even a multistart drop cable including drop cables having a number exceeding the number of drop cables expected to be stored in the existing closure, and a closure employing this structure.

Means provided in the sixth embodiment of the present invention for overcoming the above-mentioned problem and achieving the above-mentioned object will now be explained. (1) For overcoming the above-mentioned problem, the terminating structure for an aggregate drop cable in accordance with the sixth embodiment is a terminating structure for an aggregate drop cable constituted by stranding a plurality of drop cables, the structure comprising a waterproof binding section bundled with a waterproof tape wrapped about an area held with a sealing end face plate of a closure and a holding binding section bundled with a holding tape wrapped about an area held with a cable holding device; wherein, after the plurality of drop cables are arranged on the waterproof tape or holding tape, the waterproof binding section and holding binding section are wound together with the tape from one end side of the tape, so as to be finished as a substantially circular bundle having the plurality of drop cables arranged spirally.

(2) The above-mentioned terminating structure for an aggregate drop cable may be characterized in that at least a surface of the waterproof tape is formed by a thermoplastic elastomer having a low degree of hardness and an elasticity.

(3) The above-mentioned terminating structure for an aggregate drop cable may be characterized in that a surface of the holding tape is formed with an antiskid part for restraining a member in contact with the surface from moving.

(4) For overcoming the above-mentioned problem and achieving the above-mentioned object, the closure in accordance with the sixth embodiment is a closure, having the terminating structure for an aggregate drop cable according to any of the above-mentioned (1) to (3), for leading the drop cable in and out, the closure comprising, as a cable leading-in/out section for inserting therethrough the aggregate drop cable, a sealing end face plate for inserting the waterproof binding section and a cable holding device for holding the holding binding section.

In this terminating structure for an aggregate drop cable, the spirally wound waterproof tape fills and seals gaps between drop cables which are adjacent to each other in a radial direction of the spiral, so that the waterproof binding section at an end part of the aggregate drop cable does not lose its waterproofness at the cable inserting sections even when collectively inserted therethrough as a single waterproof cable having a large diameter in a bundled state.

The spirally wound holding tape is interposed between drop cables which are adjacent to each other in a radial direction of the spiral, so that the holding binding section at an end part of the aggregate drop cable is bound like a multicore cable in which the adjacent drop cables are kept from relatively slipping with respect to each other, and thus can favorably hold and secure all the drop cables even when collectively held as a single cable having a large diameter in a bundled state by the cable holding device.

By assigning a cable inserting section for a main cable or branch cable to a cable inserting section for inserting therethrough the waterproof binding section of an aggregate drop cable and a cable holding device for a main cable or branch cable to a cable holding device for holding the holding binding section, for example, the closure in accordance with the sixth embodiment can store a multistart aggregate drop cable without modifying the existing sealing end face plate or cable holding device and taking labor.

The terminating structure for an aggregate drop cable in accordance with the sixth embodiment of the present invention will now be explained in detail with reference to the drawings.

FIG. 22 is a front view of a mode for carrying out a closure for leading in and out the aggregate drop cable in the terminating structure in accordance with the sixth embodiment, FIG. 23 is a perspective view illustrating a structure for holding the aggregate drop cable in the cable leading-in/out section of the closure illustrated in FIG. 22, FIG. 24 is a perspective view of the terminating structure for the aggregate drop cable inserted into the cable leading-in/out section illustrated in FIG. 23, and FIG. 25 is a sectional view taken along the line B-B of FIG. 24.

The closure 351 illustrated in FIG. 22, which is installed at a so-called distribution point of an optical cable network and stores and protects an optical cable connecting section 309 for connecting a branch cable or aggregated drop cable 306 as a sub-branch line to a main cable 303 such as a multicore slotted ribbon cable, and is constituted by a cylindrical case 353 surrounding the outer periphery of the optical cable connecting section 309 and cable leading-in/out sections 341 provided in opening parts 353a, 353b at both ends of the cylindrical case 353 through which the cables 303, 306 are let in and out.

Utilized as the aggregate drop cable 306 is one obtained by subjecting any of the aggregate drop cables 311, 317 illustrated in FIGS. 28 and 29 and the like to a terminating process which will be explained later.

As mentioned above, the cylindrical case 353 is one forming a cylindrical structure opening at both ends by a case main body 354 storing the optical cable connecting section 309 and opening the front face and a cover 355 covering the open face of the case main body 354. In the illustrated example, the cover 355 has one side edge 355a hinged to the case main body 354 so as to be openable and closable. The other side edge 355b of the cover 355 is provided with an elastic stopper 355c adapted to engage an engagement section on the case main body 354 side when the cover 355 is closed.

The cable leading-in/out section 341 comprises sealing end face plates 371 which hermetically close opening parts 353a, 353b at both ends of the cylindrical case 353 and are formed with cable inserting sections 363, 365, 367, and cable holding devices 373 which hold and secure the cables 303, 306 and single-core drop cables inserted through the cable inserting sections 363, 365, 367.

As illustrated in FIG. 23, the sealing end face plate 371 comprises an outer shell base 377 which is formed by a hard resin, metal, or the like and defines an outer shell form, and sealing plates 379, 380, 381 made of a rubber which are attached to the inner peripheral part of the outer shell base 377 and provide the respective cable inserting sections 363, 365, 367.

The sealing end face plate 371 has the same structure as that illustrated in FIGS. 30 to 32. The cable inserting section 363 formed in the sealing plate 379 made of a rubber is a hole for inserting therethrough the main cable 303, the cable inserting section 365 is a hole for inserting therethrough the branch cable 305 (see FIG. 30) or the aggregate drop cable 306, and the cable inserting sections 367 are holes for inserting therethrough the respective single-core drop cables 307 one by one. Each of the cable inserting sections 363, 365 is constructed so as to be able to open by being divided into two as illustrated in FIG. 32 in order for cables to be simply inserted therethrough by wedging.

As illustrated in FIG. 23, the cable holding device 373 is constituted by a device main body 374 secured to the case main body 354, insert nuts 343 screwed to the device main body 374 in order to hold the cables 303, 305, 306, and position regulating plates 375 secured to the device main body 374 in order to hold the single-core drop cables 307.

A pair of insert nuts 343 are arranged at each of positions corresponding to the cable inserting sections 363, 365 and hold and secure the cable 303, 305, 306 inserted through the cable inserting section 363, 365 by clasping.

Each of the position regulating plates 375, which is a resin molded product, is formed with a plurality of cable holding grooves 389, at predetermined intervals, for holding the drop cables 307 and is constructed such as to hold a plurality of drop cables 307 in an aligned state by individually wedging the drop cables 307 inserted through the cable inserting sections 367 into the respective cable holding grooves 389 one by one. However, this embodiment uses no single-core drop cables 307 and thus does not utilize the position regulating plates 375.

In the closure 351 of this embodiment, as illustrated in FIG. 23, the aggregate drop cable 306 is inserted through the cable inserting section 365 for the branch cable 305 having a hole diameter corresponding to the outer diameter of the aggregate drop cable 306 and secured by clasping with a pair of insert nuts 343 corresponding to the cable inserting section 365.

As illustrated in FIG. 24, at an end part of the aggregate drop cable 306, a waterproof binding section 323 is formed by wrapping a waterproof tape 321 about a bundle of all the single-core drop cables 313 constituting the cable in an area to be held with the sealing end face plate 371 of the cable leading-in/out section 341 in the closure 351. A holding binding section 327 is formed by wrapping a holding tape 325 about a bundle of all the single-core drop cables 313 constituting the cable in an area to be held with the cable holding device 373 of the cable leading-in/out section 341.

A plurality of untied drop cables 313 are arranged in a row on the waterproof tape 321 or holding tape 325 as illustrated in FIG. 25, and then are wound together with the tape 321, 325 from one end side thereof as illustrated in FIG. 26, whereby the waterproof binding section 323 and holding binding section 327 are finished as a substantially cylindrical bundle in which a plurality of drop cables 313 are arranged spirally.

For filling the gaps between the drop cables 313 arranged on the surface, at least a surface of the waterproof tape 321 is formed from a thermoplastic elastomer (SEBS copolymer) having a low degree of hardness and an elasticity. The thickness of the waterproof tape 321 is set to about 1 to 2 mm.

The holding tape 325 is formed by extruding a resin material such as polyethylene or polypropylene into a tape shape and has a surface formed with wavy or irregular antiskid parts for restraining the drop cables 313 from coming into contact with the surface. The thickness of the waterproof tape 325 is set to about 1 to 2 mm.

The antiskid parts are those roughening the surface with the above-mentioned irregularities, for example, by embossing the surface at the time of extruding the resin. A metal tape may also be used as the holding tape 325. Antiskid irregularities and the like for restraining the movement of contactable members are also formed by embossing the surface in this case.

In the terminating structure for the aggregate drop cable 306 explained in the foregoing, the elastomer layer of the spirally wound waterproof tape 321 fills the gaps between the drop cables 313 adjacent to each other in the radial direction of the spiral, thereby sealing the gaps in the drop cables 313 adjacent to each other in the radial and circumferential directions, whereby the waterproof binding section 323 at the end part of the aggregate drop cable 306 does not lose waterproofness at the cable inserting section 365 even when collectively inserted therethrough as a single waterproof cable having a large diameter in a bundled state.

Since the spirally wound holding tape 325 is interposed between the drop cables 313 adjacent to each other in the radial direction of the spiral and binds them as a multicore cable in which the adjacent drop cables 313 are kept from slipping with respect to each other, the holding binding section 327 of the aggregate drop cable 306 can favorably hold and secure all the drop cables 313 even when they are collectively clasped as a single cable in a bundled state having a large diameter by a pair of insert nuts 343.

Therefore, when inserting the aggregate drop cable 306 through the cable leading-in/out section 341 of the closure 351, the terminating structure for the aggregate drop cable 306 in accordance with the sixth embodiment can lead the cable in a bundled state into and out of the closure 351, for example, by using the cable inserting section 365 for branch cables and the insert nuts 343 as illustrated in FIG. 23 without using the dedicated cable inserting sections 367 for inserting the drop cables one by one, thereby making it possible to reduce the labor of storing it into the closure 351 and improve the workability. Even a multistart drop cable including drop cables whose number exceeds the number of those estimated to be storable in the existing closure 351 can be stored therein.

Since the waterproof tape 321 used for forming the waterproof binding section 323 has a surface formed by a thermoplastic elastomer having a low degree of hardness and an elasticity, the single-core drop cables 313 in contact with the tape surface bite into the surface because of its elastic deformation, so that the gaps between the adjacent drop cables 313 are filled, which makes it possible to attain favorable waterproofness.

The holding tape 325 used for forming the holding binding section 327 has a surface formed with antiskid parts, so that slippage is harder to occur when held by the insert nuts 343, which makes it easier to hold.

By assigning the cable inserting section 365 for branch cables to the cable inserting section for inserting the waterproof binding section 323 of the aggregate drop cable 306 therethrough and the insert nuts 343, which are cable holding devices for branch cables, to the cable holding devices for holding the holding binding section 327 of the aggregate drop cable 306, the closure 351 employing the terminating structure of this embodiment is applicable to the multistart aggregate drop cable 306 without modifying the existing sealing end face plate 371 and cable holding device 373 and taking labor.

The terminated aggregate drop cable 306 is inserted through the cable inserting section 365 for the branch cable 305 in the above-mentioned embodiment, but may be inserted through the cable inserting section 363 for the main cable 303.

BRIEF DESCRIPTION OF DRAWINGS

FIGS. 8a and 8b are a schematic plan view of each connecting module illustrated in FIG. 7;

REFERENCE SIGNS LIST

Figure 1:
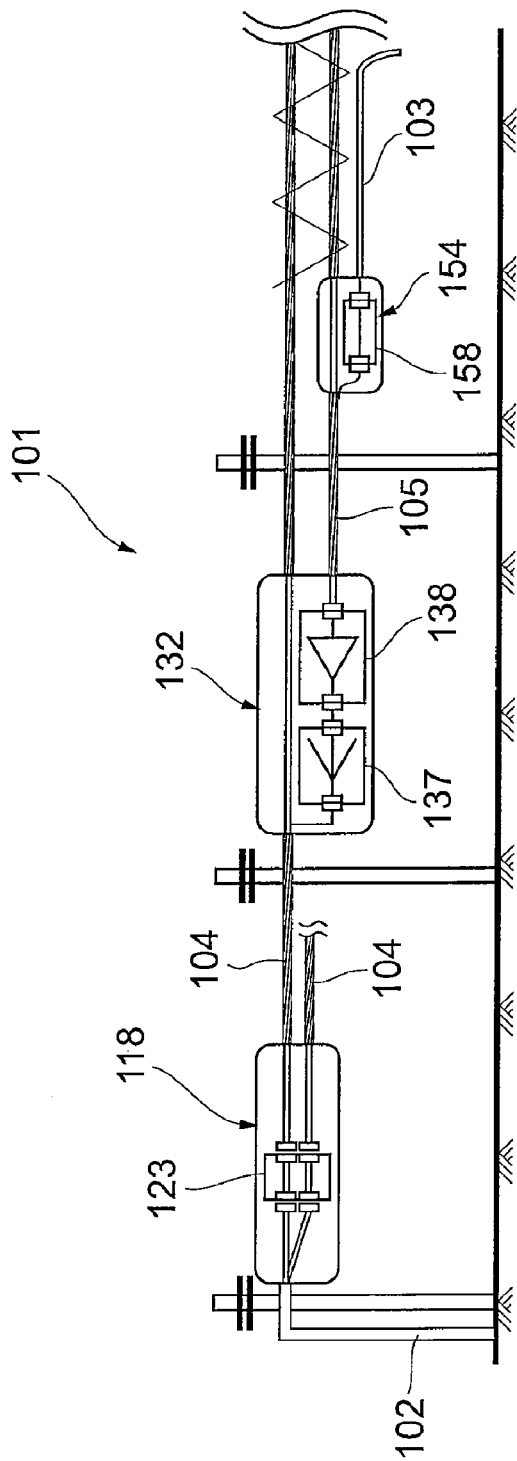
FIG. 1 is a structural view illustrating an optical interconnection system equipped with the first embodiment of the optical cable connecting closure in accordance with the present invention.
Figure 2:
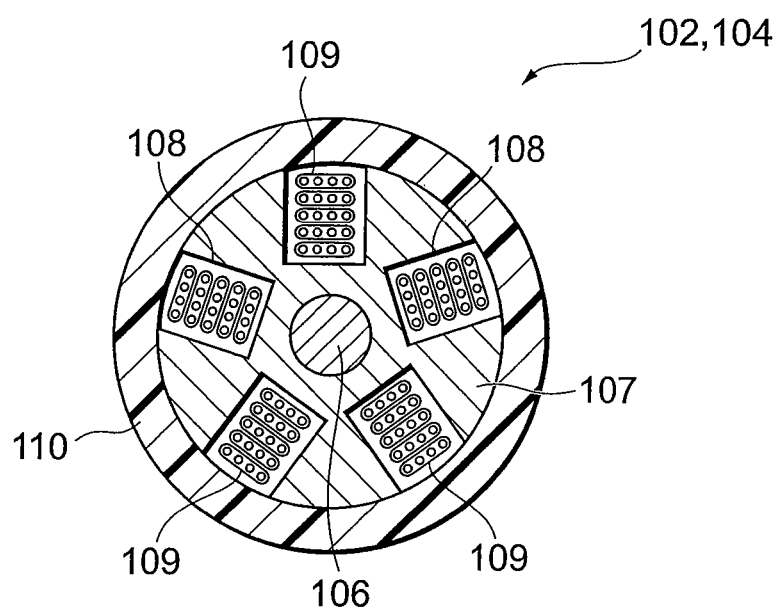
FIG. 2 is an enlarged sectional view of the feeder cable and branch cable illustrated in FIG. 1.
Figure 3:
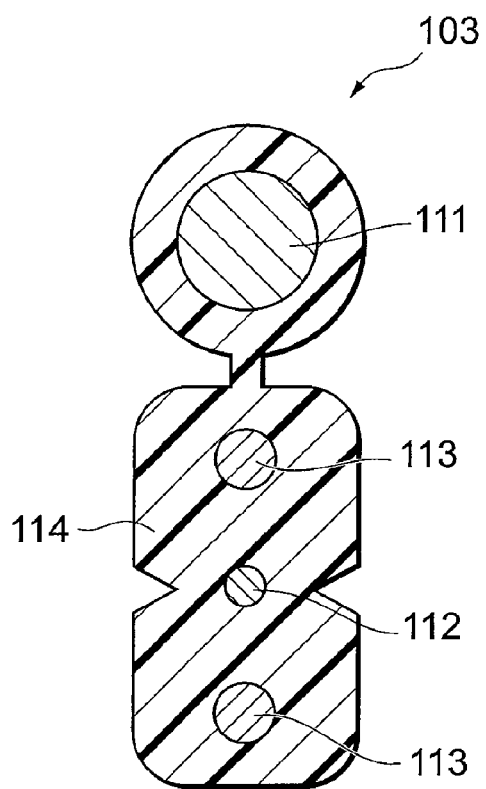
FIG. 3 is an enlarged sectional view of the drop cable illustrated in FIG. 1.
Figure 4:
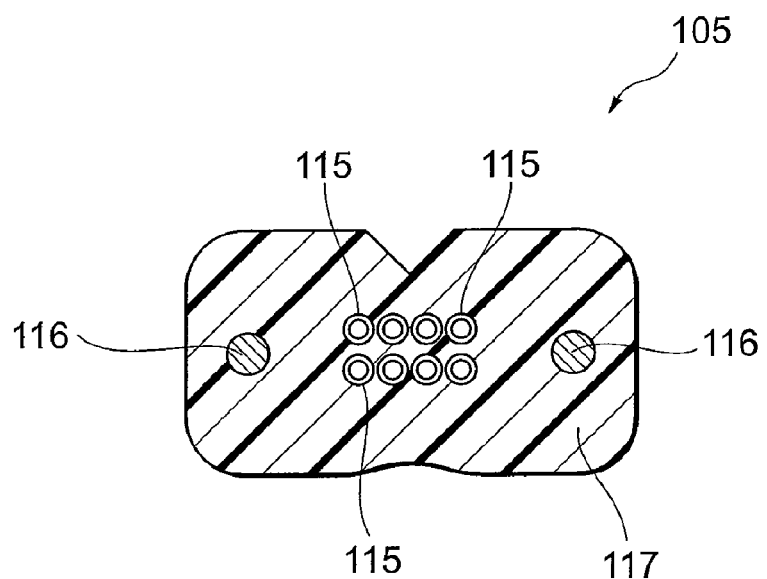
FIG. 4 is an enlarged sectional view of the sub-branch cable illustrated in FIG. 1.
Figure 5:
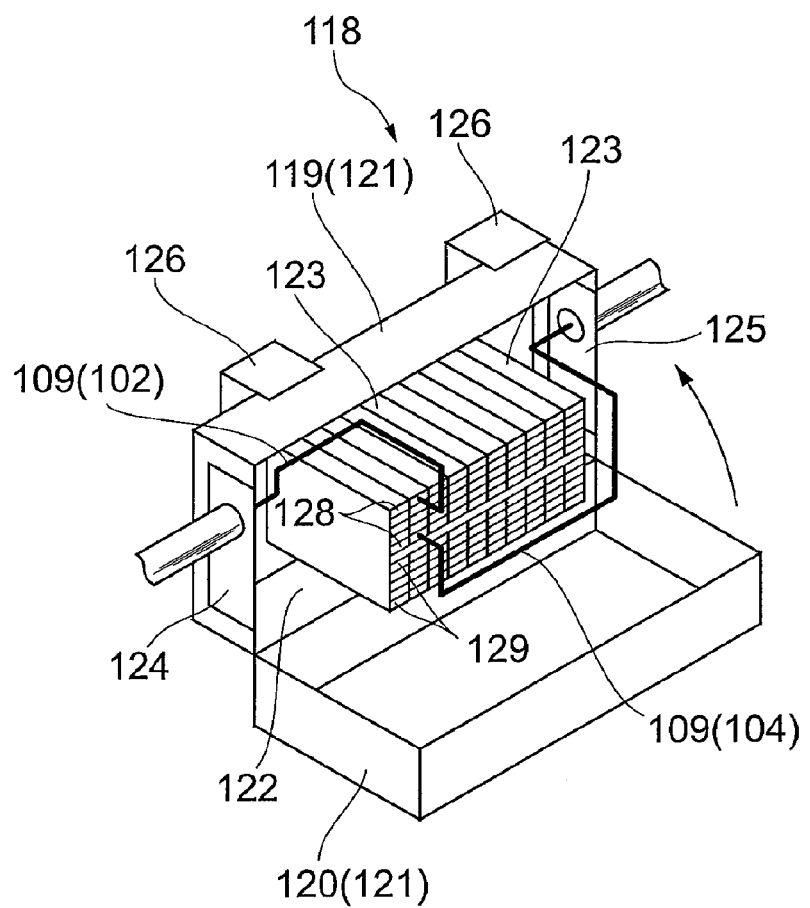
FIG. 5 is a perspective view of the feeder closure illustrated in FIG. 1 in its open state.
Figure 6:
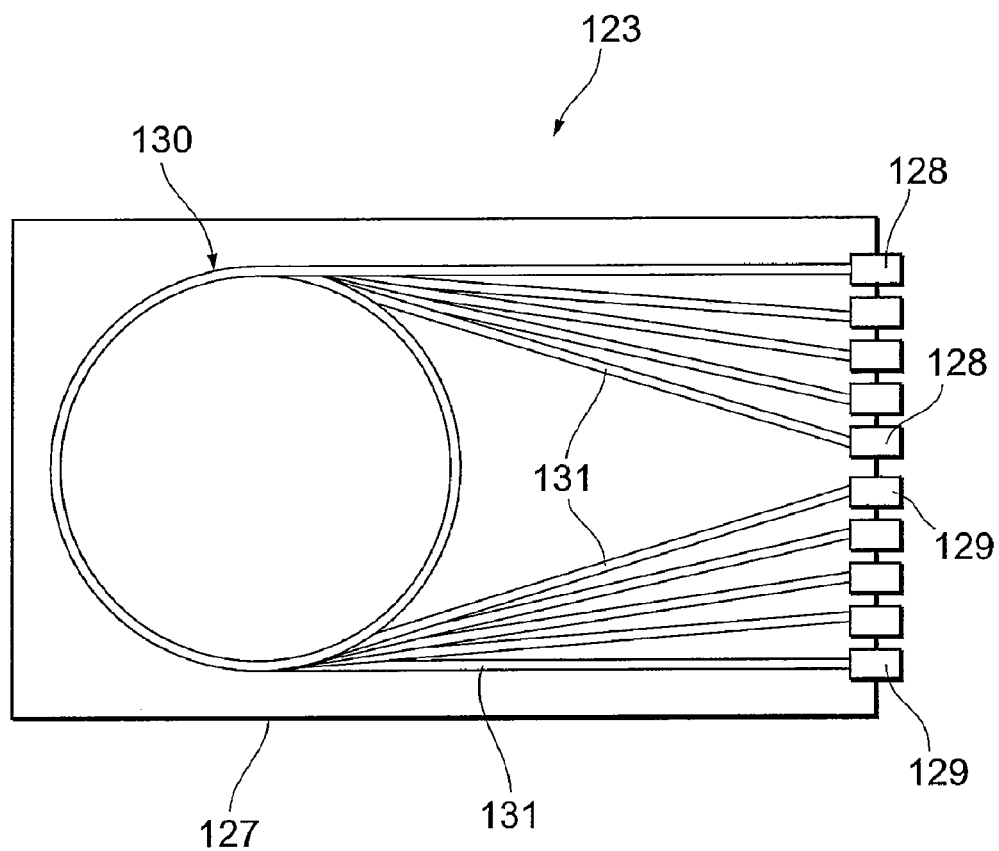
FIG. 6 is a schematic plan view of the connecting module illustrated in FIG. 5.
Figure 7:
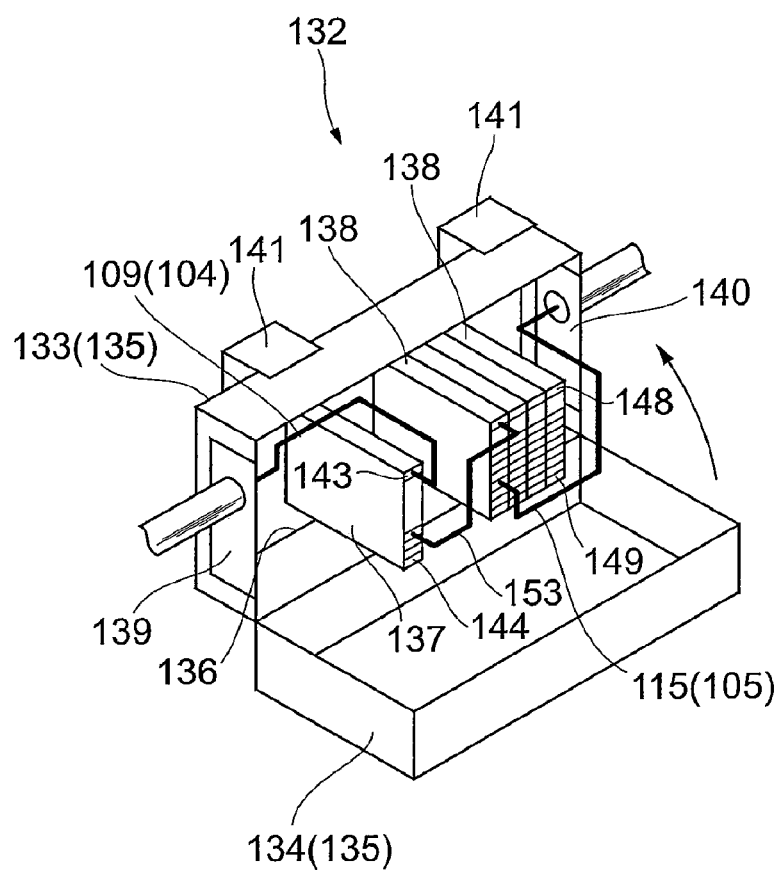
FIG. 7 is a perspective view of the distribution closure illustrated in FIG. 1 in its open state.
Figure 9:
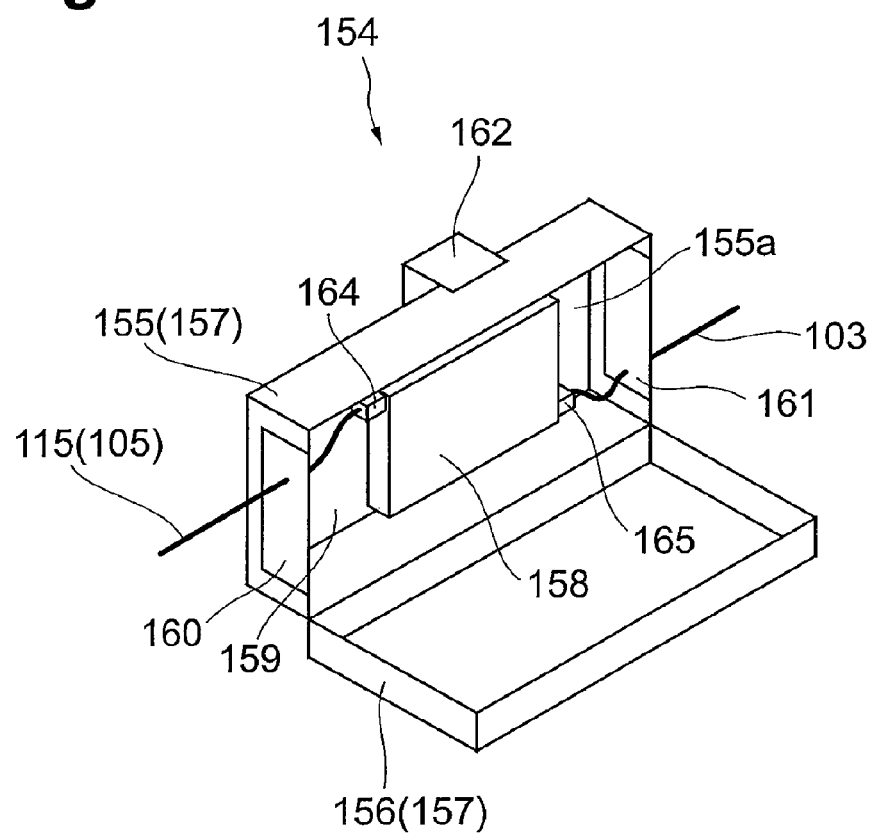
FIG. 9 is a perspective view of the drop closure illustrated in FIG. 1 in its open state.
Figure 10:
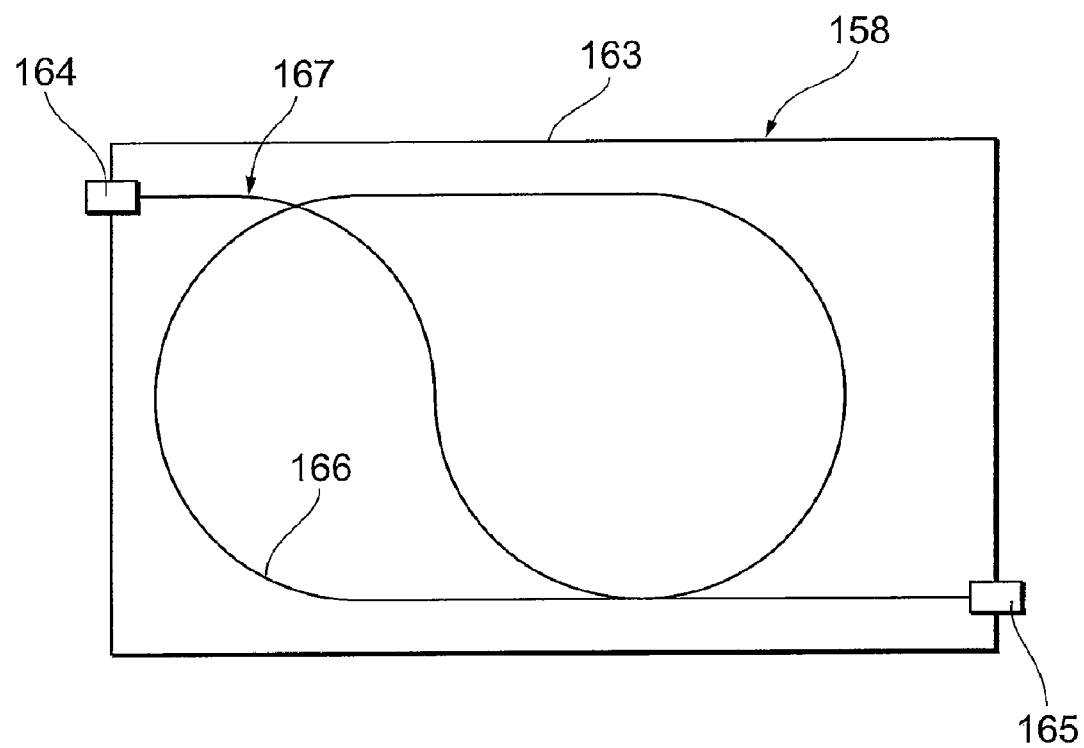
FIG. 10 is a schematic plan view of the connecting module illustrated in FIG. 9.
Figure 11:
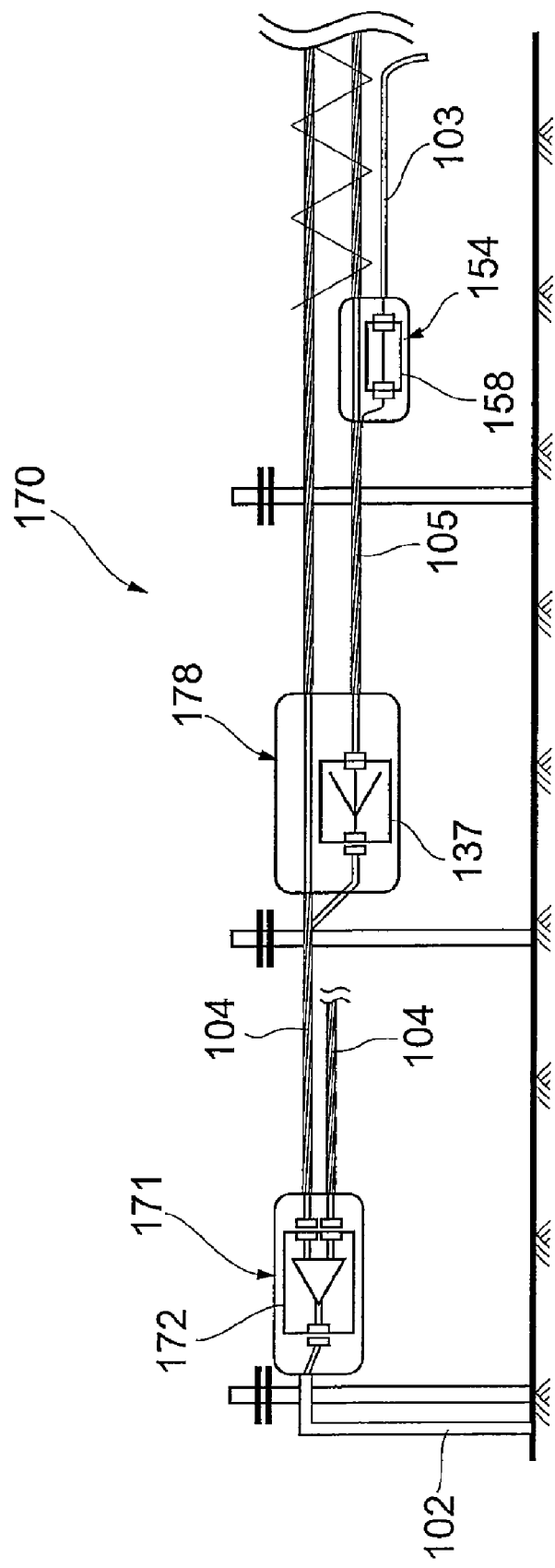
FIG. 11 is a structural view illustrating another optical interconnection system equipped with the second embodiment of the optical cable connecting closure in accordance with the present invention.
Figure 12:
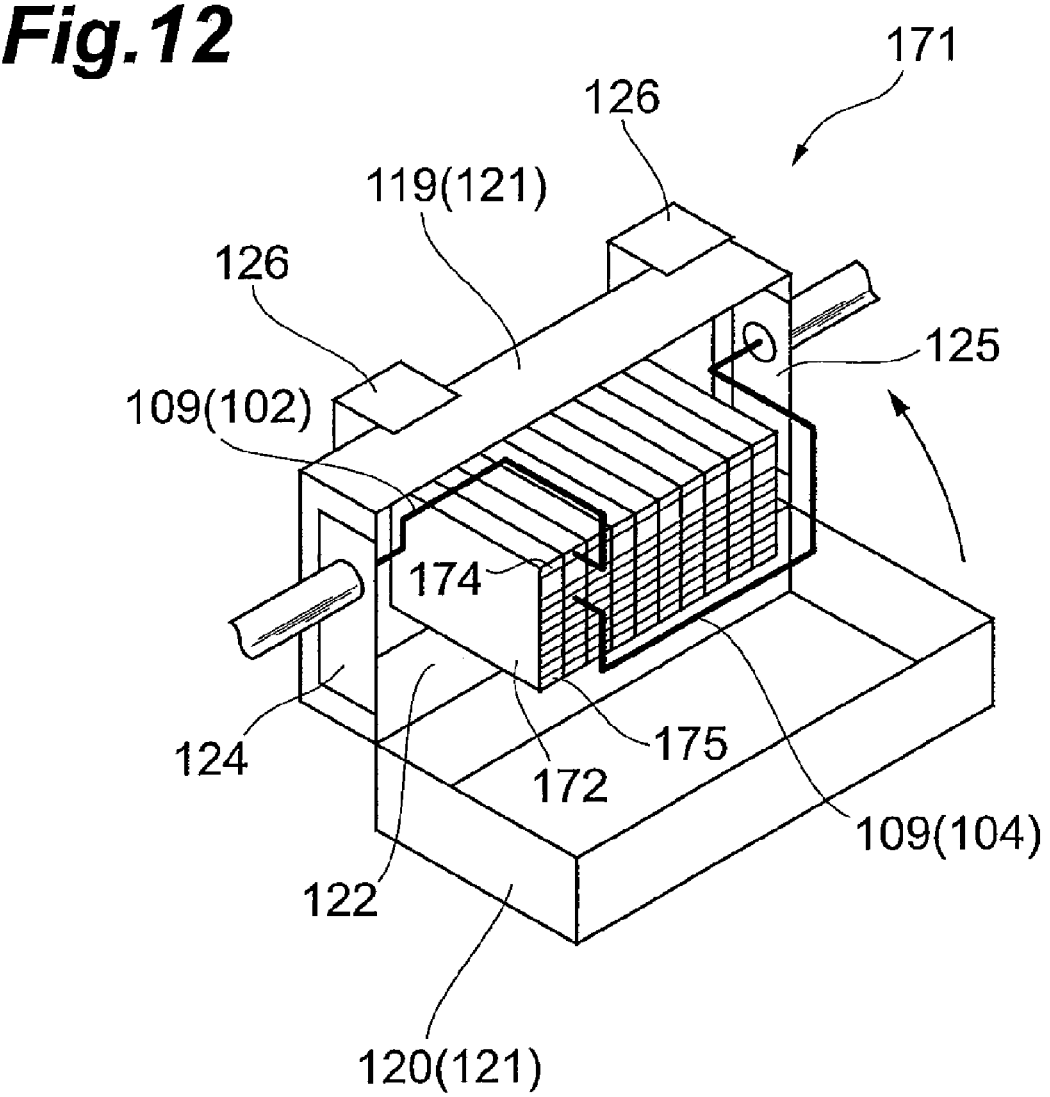
FIG. 12 is a perspective view of the feeder closure illustrated in FIG. 11 in its open state.
Figure 13:
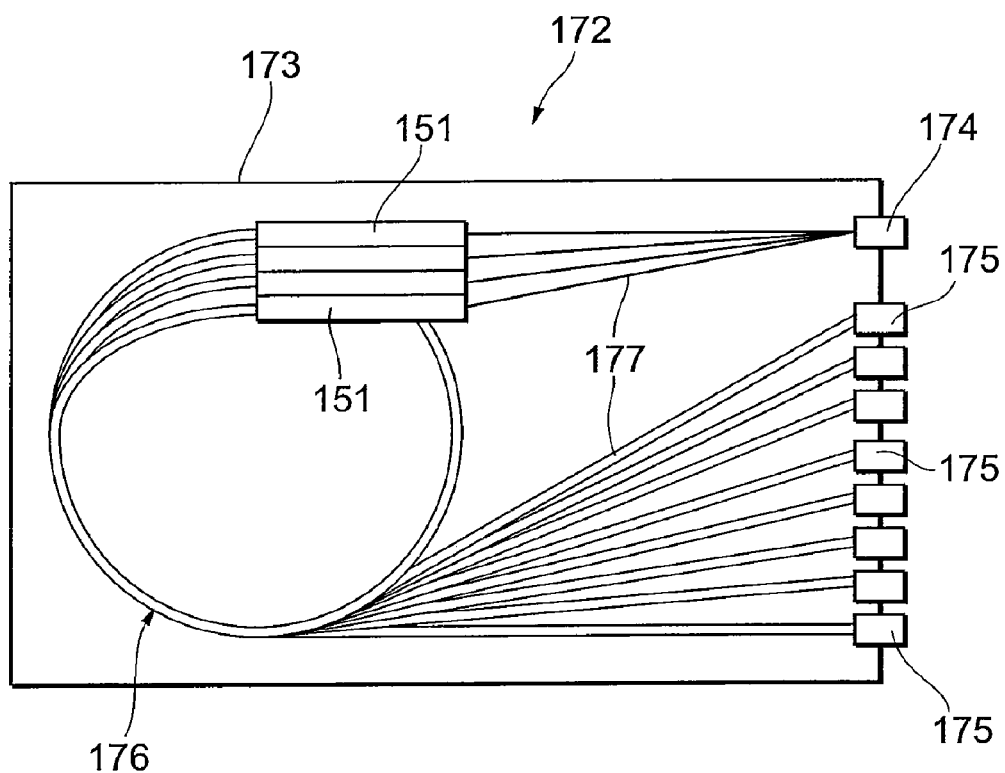
FIG. 13 is a schematic plan view of the connecting module illustrated in FIG. 12.
Figure 14:
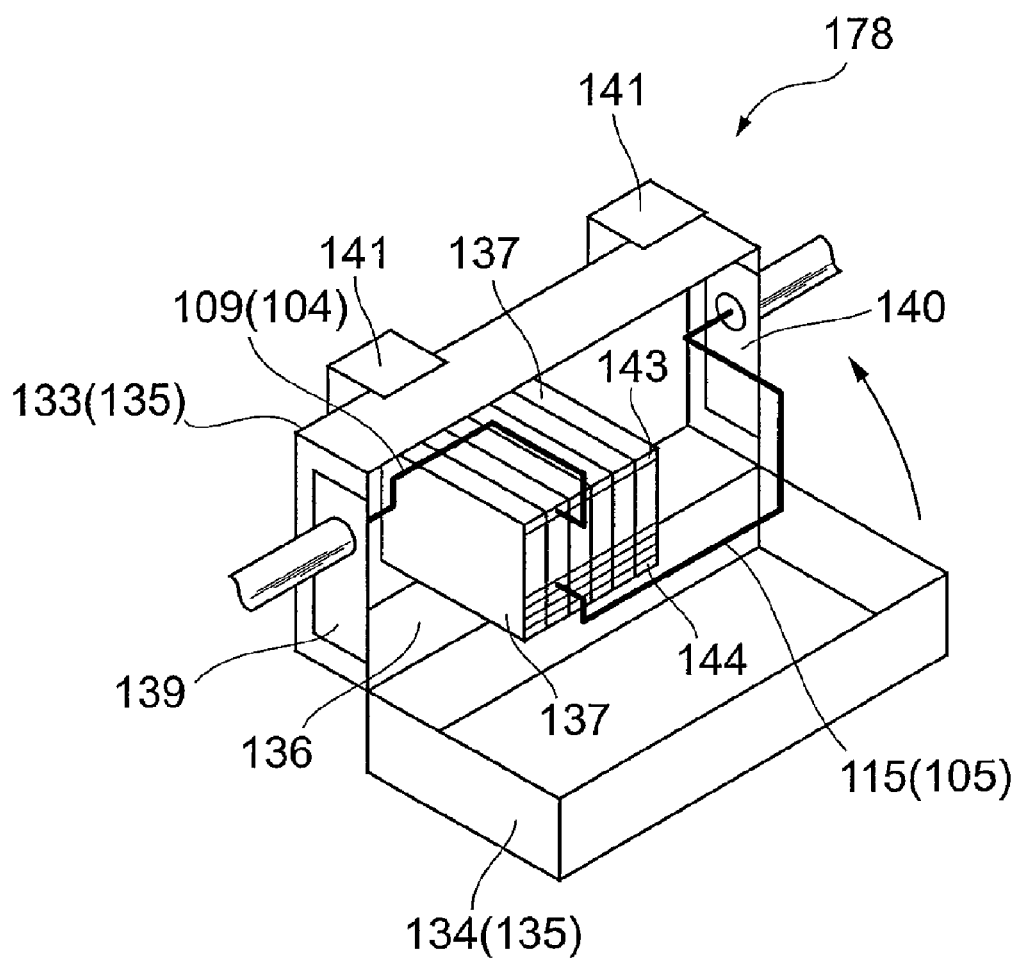
FIG. 14 is a perspective view of the distribution closure illustrated in FIG. 11 in its open state.
Figure 15:
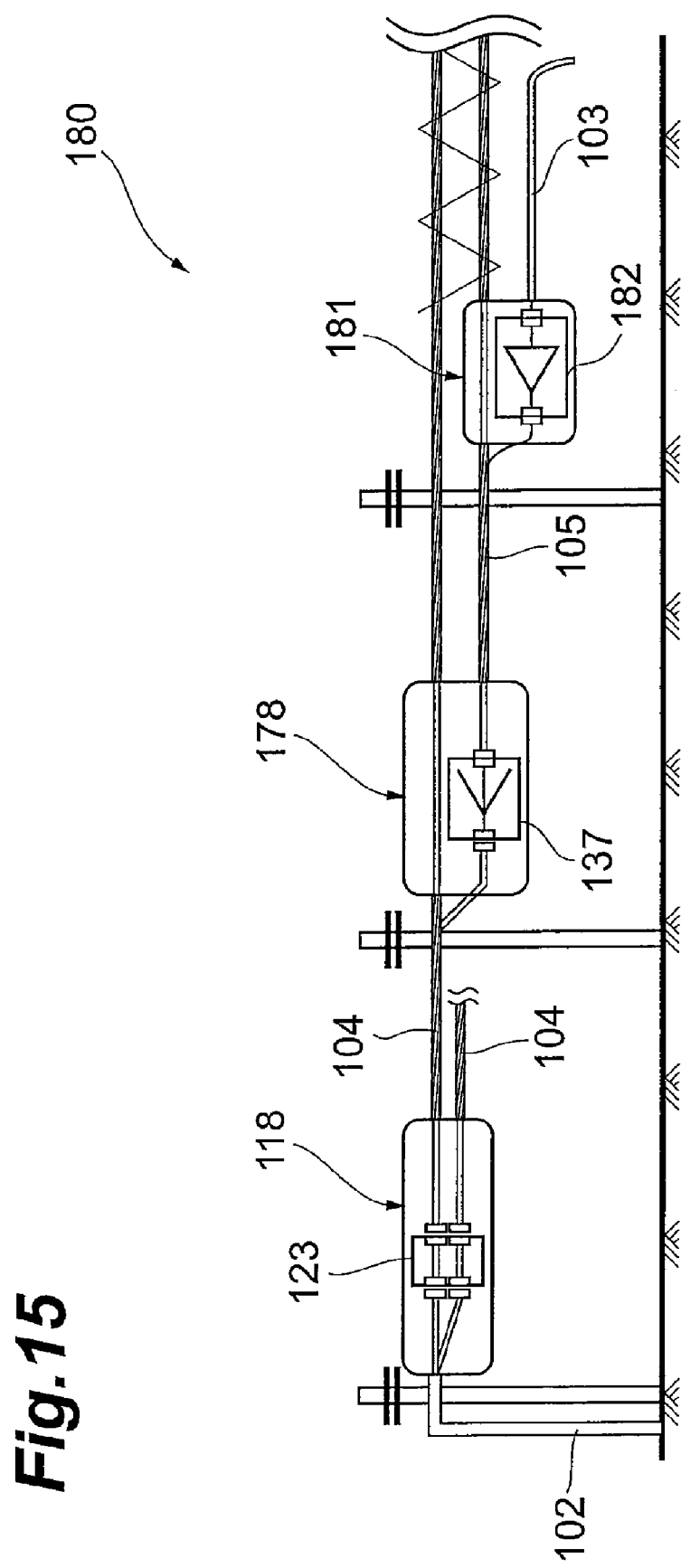
FIG. 15 is a structural view illustrating still another optical interconnection system equipped with the third embodiment of the optical cable connecting closure in accordance with the present invention.
Figure 16:
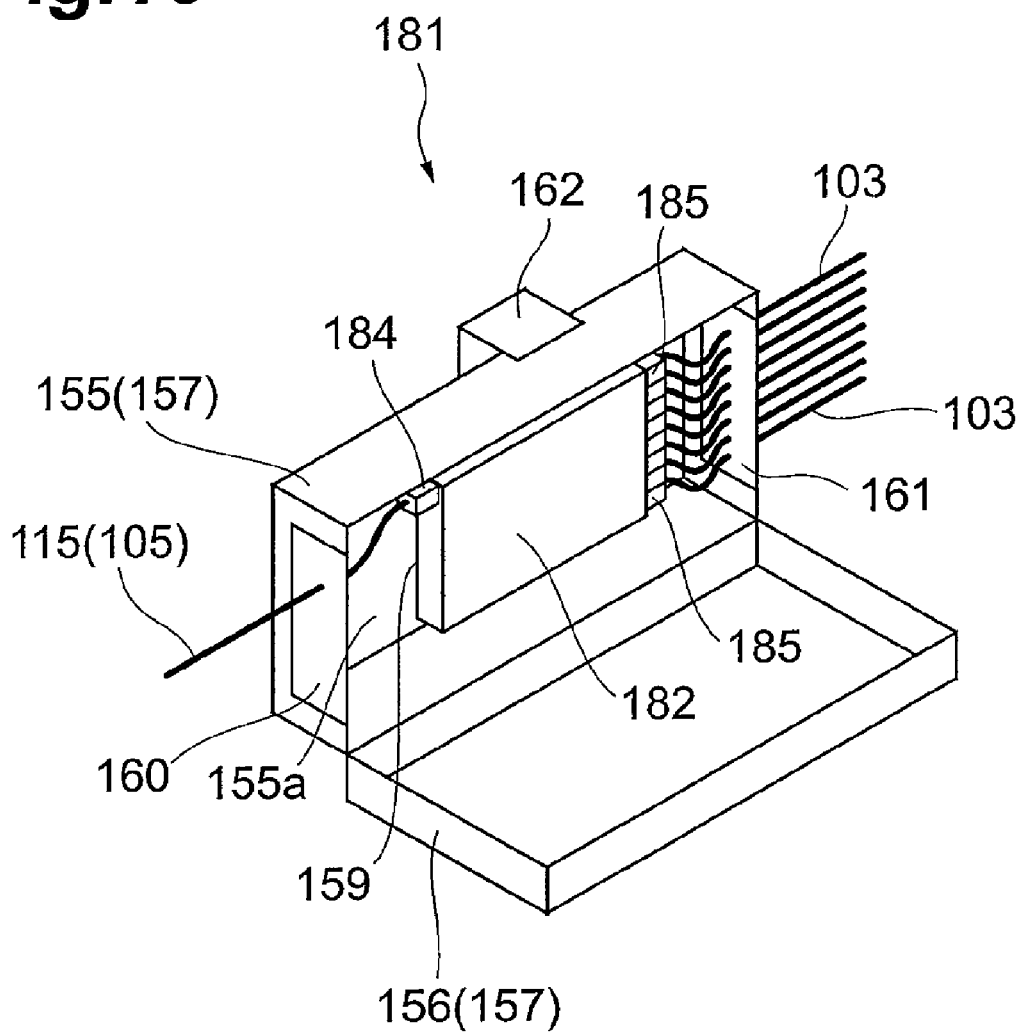
FIG. 16 is a perspective view of the drop closure illustrated in FIG. 15 in its open state.
Figure 17:
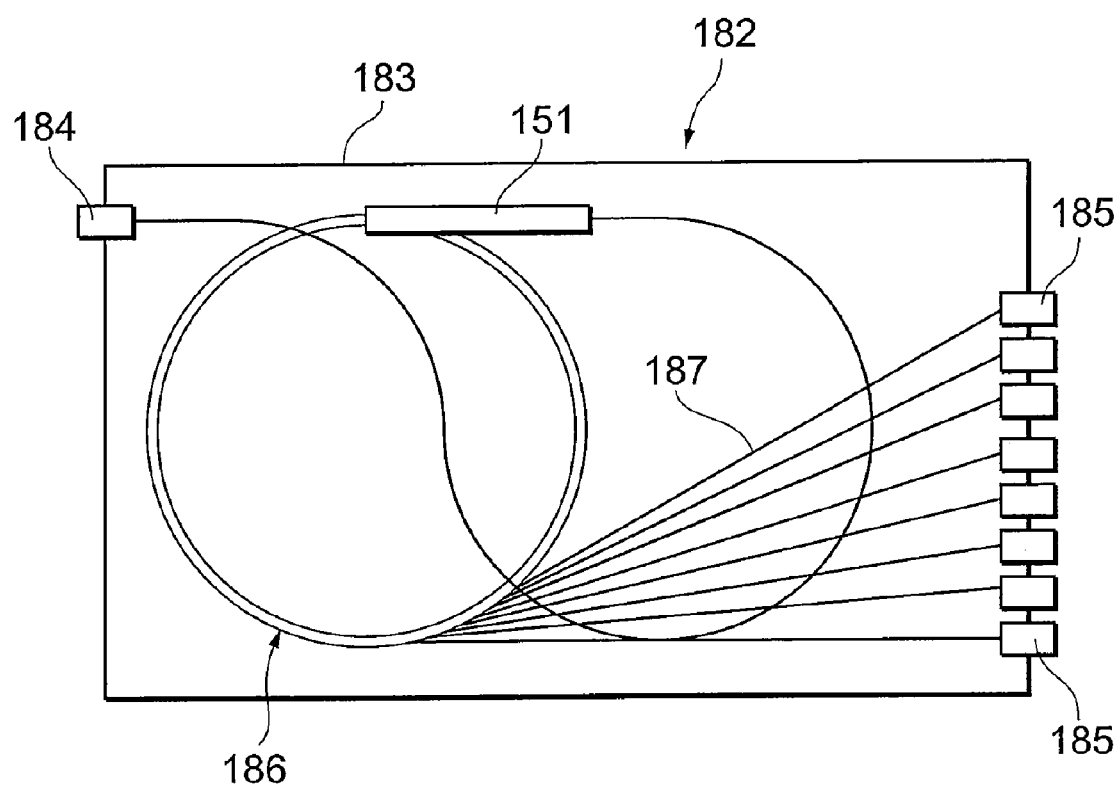
FIG. 17 is a schematic plan view of the connecting module illustrated in FIG. 16.
Figure 18:
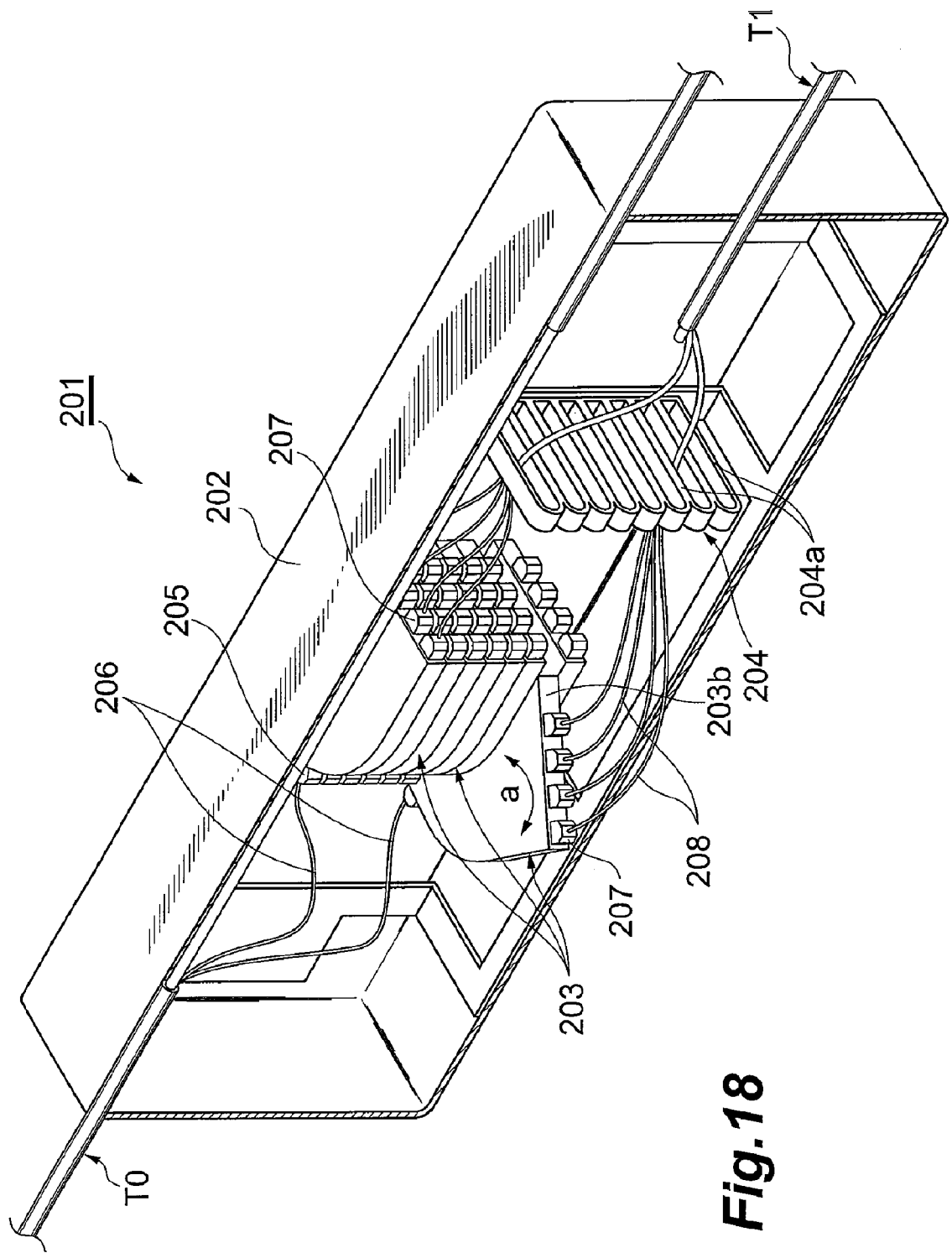
FIG. 18 is a sectional perspective view illustrating the optical cable connecting closure in accordance with the fourth embodiment of the present invention.
Figure 19:
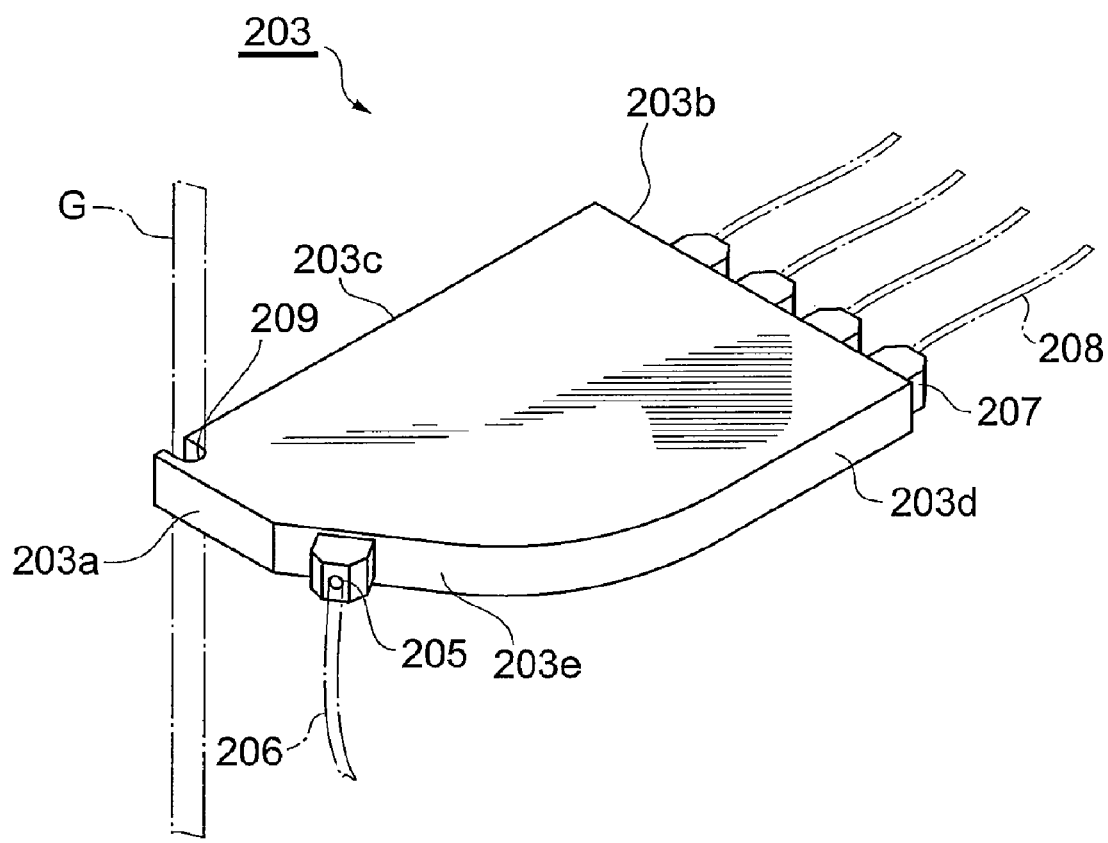
FIG. 19 is a perspective view illustrating a module section of the optical cable connecting closure in FIG. 18.
Figure 20:
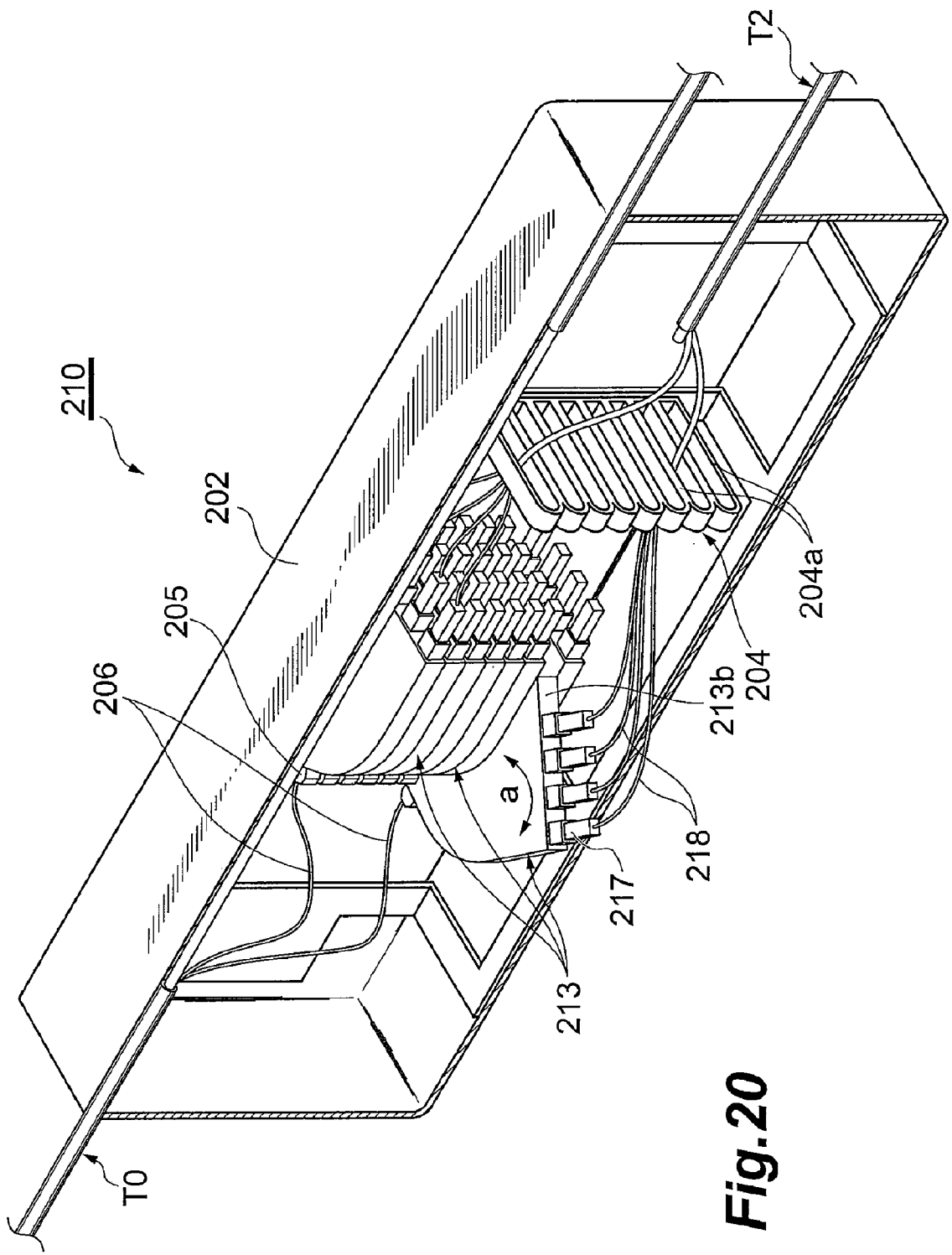
FIG. 20 is a sectional perspective view illustrating the optical cable connecting closure in accordance with the fifth embodiment of the present invention.
Figure 21:
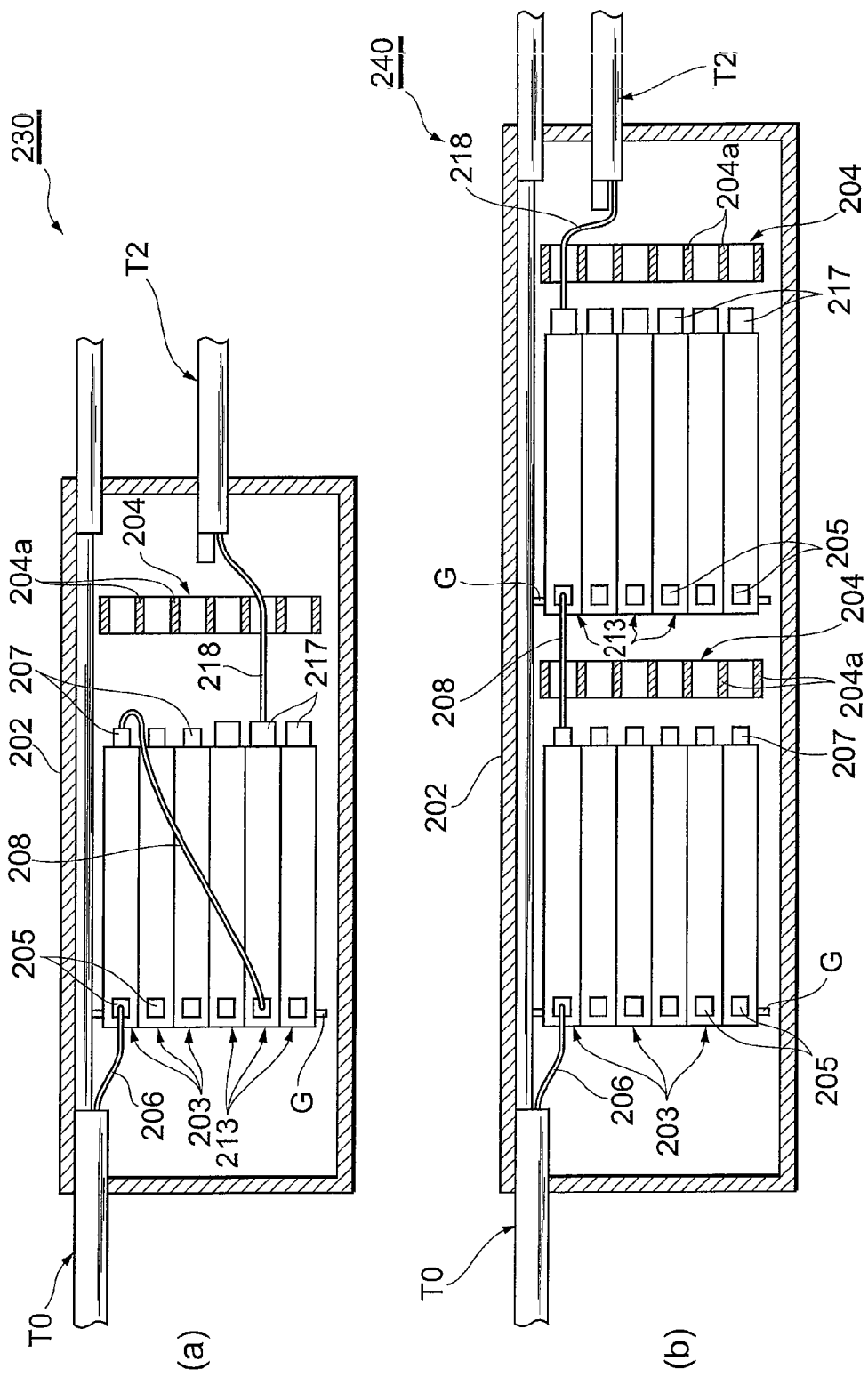
FIG. 21 is a sectional view illustrating the optical cable connecting closure in accordance with a modified example of the fourth and fifth embodiments of the present invention.
Figure 22:
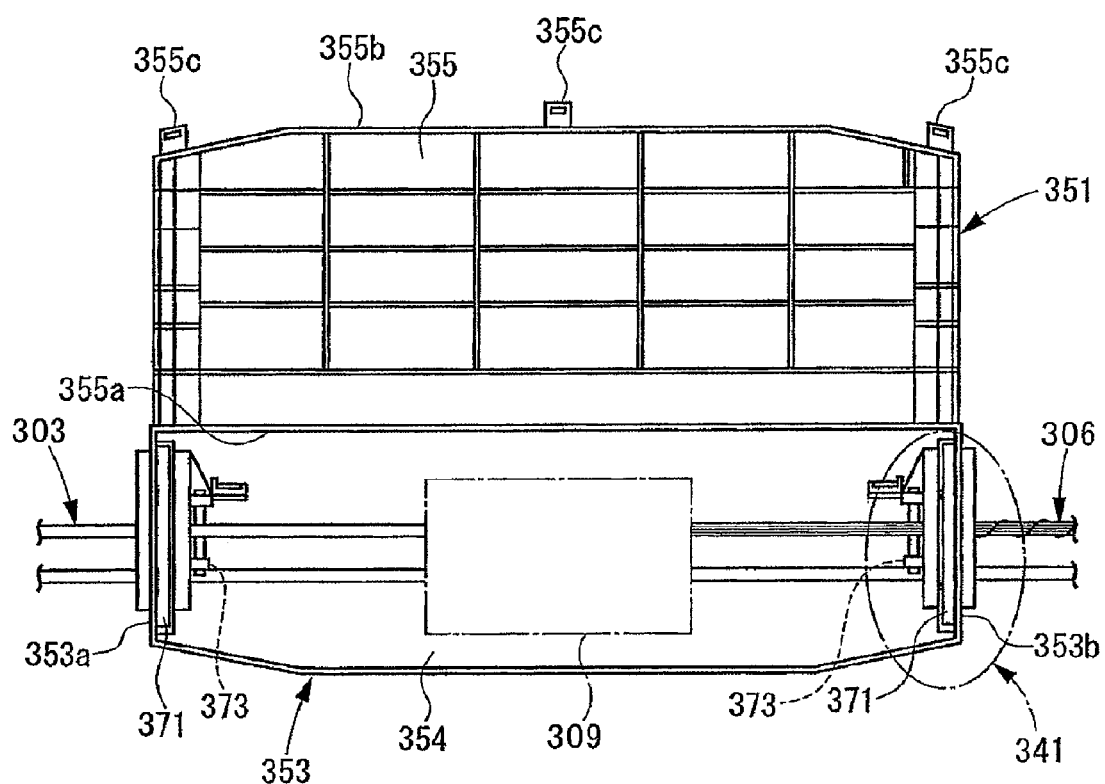
FIG. 22 is a front view of a mode for carrying out a closure for leading in and out the aggregate drop cable in the terminating structure in accordance with the sixth embodiment of the present invention.
Figure 23:
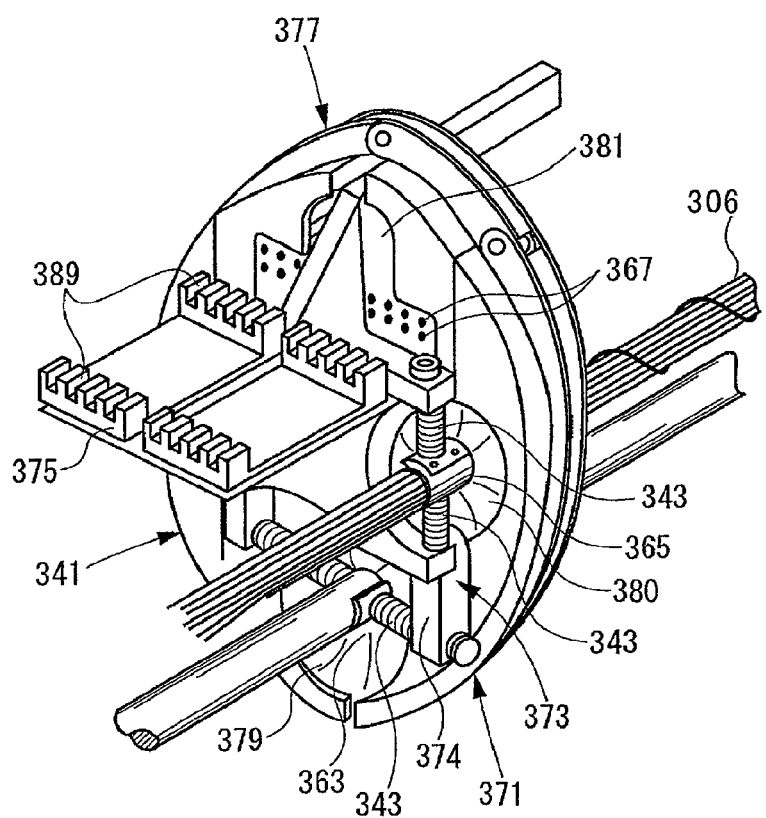
FIG. 23 is a perspective view illustrating a structure for holding the aggregate drop cable in the cable leading-in/out section of the closure illustrated in FIG. 22.
Figure 24:
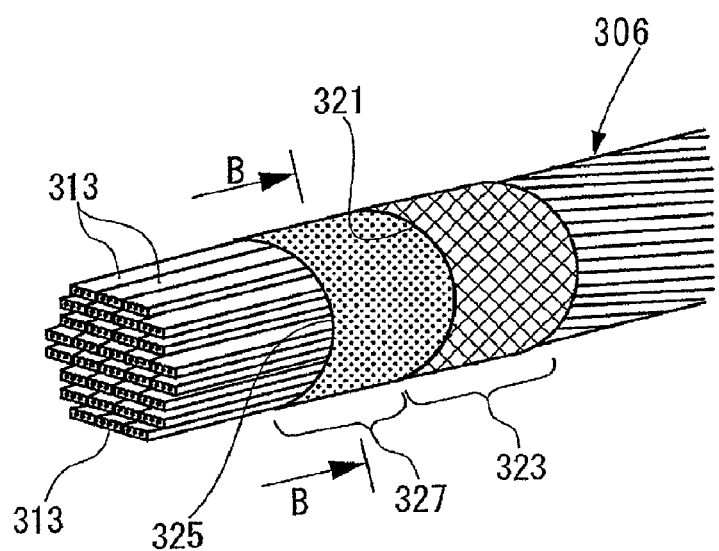
FIG. 24 is a perspective view of the terminating structure for the aggregate drop cable inserted into the cable leading-in/out section illustrated in FIG. 23.
Figure 25:
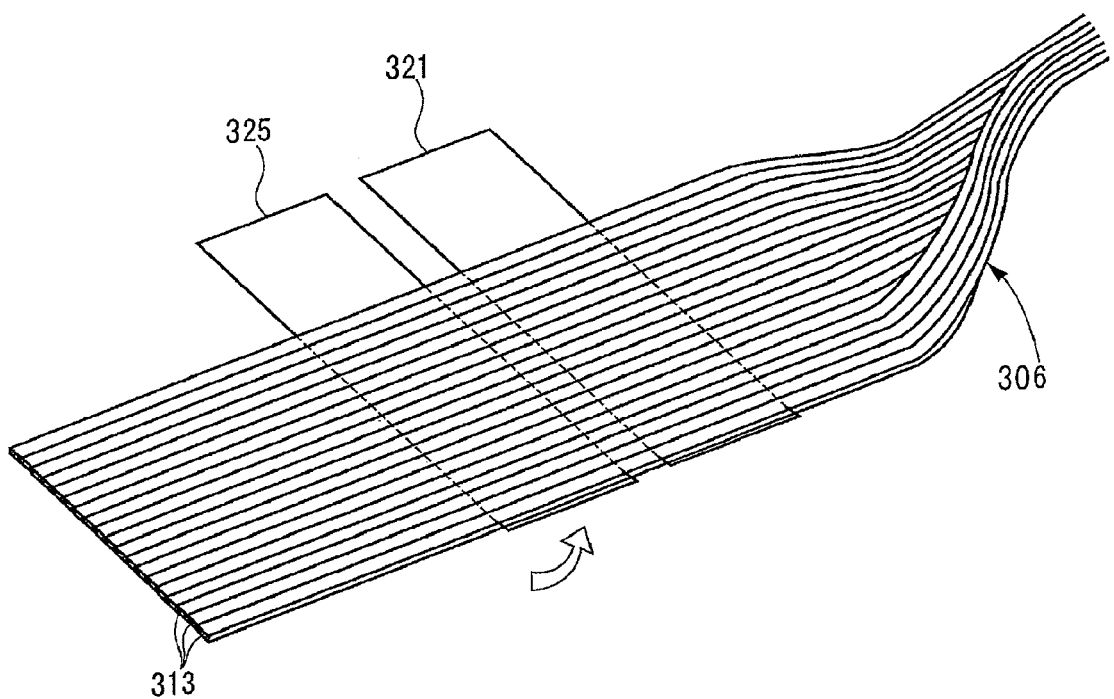
FIG. 25 is an explanatory view of a method of forming the waterproof binding section and holding binding section illustrated in FIG. 24.
Figure 26:
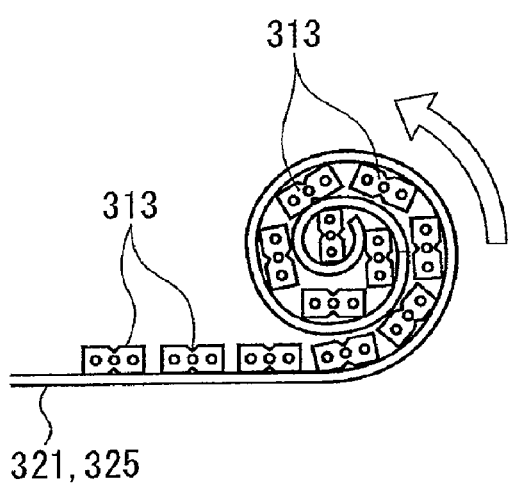
FIG. 26 is a sectional view of a state where a tape begins to wind spirally from the state illustrated in FIG. 25.
Figure 27:
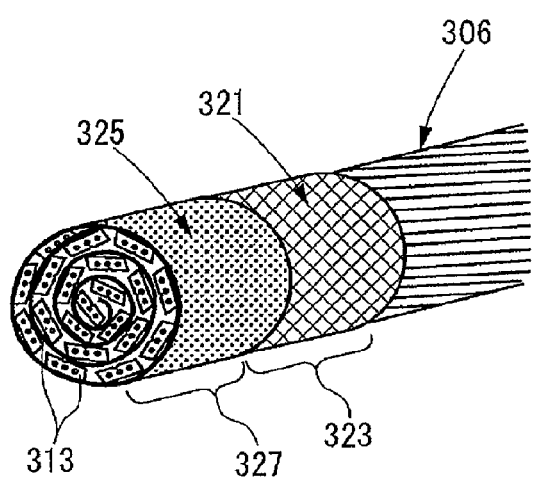
FIG. 27 is a sectional view taken along the line B-B of FIG. 24.
Figure 28:
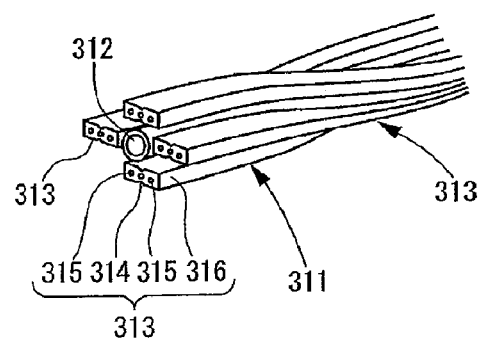
FIG. 28 is a perspective view of an example of the aggregate drop cable in the sixth embodiment.
Figure 29:
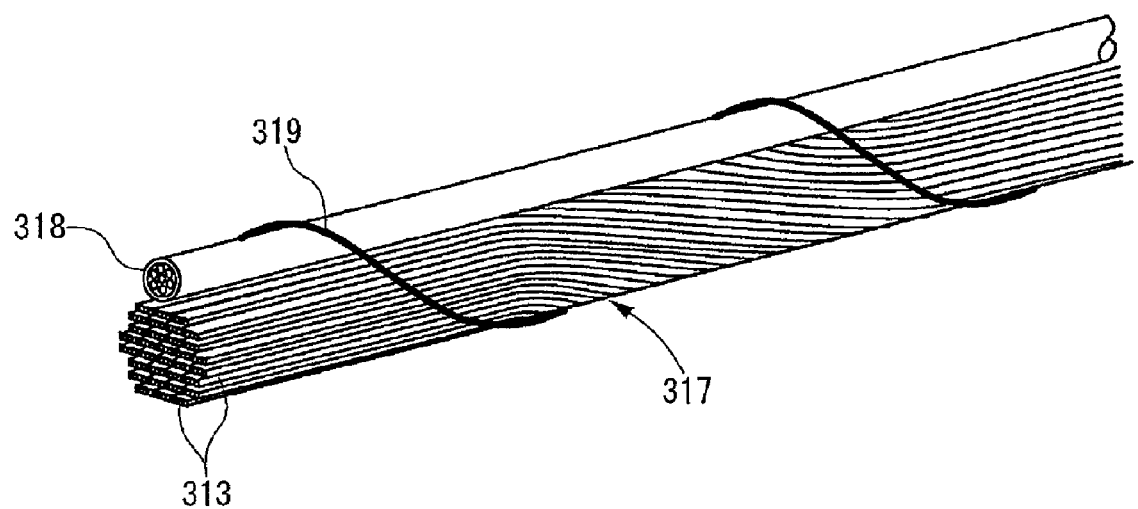
FIG. 29 is a perspective view of another example of the aggregate drop cable in the sixth embodiment.
Figure 30:
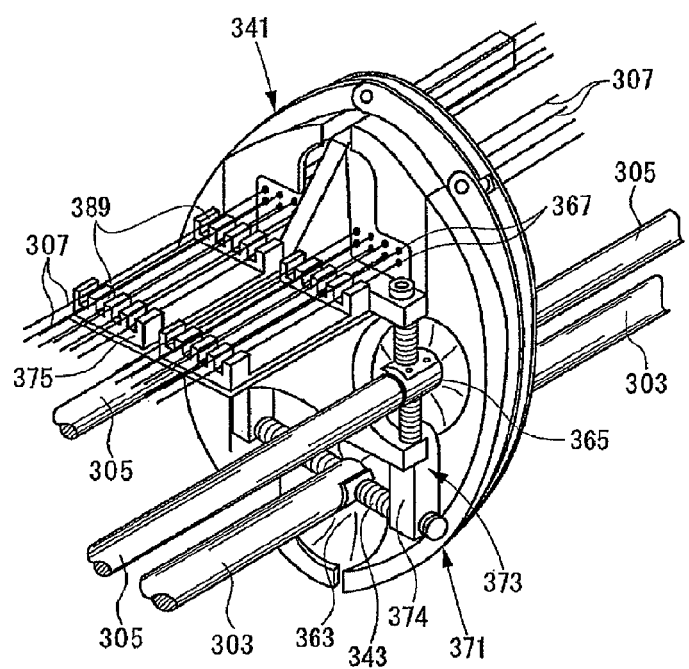
FIG. 30 is a perspective view illustrating the structure of a cable leading-in/out section in a conventional closure.
Figure 31:
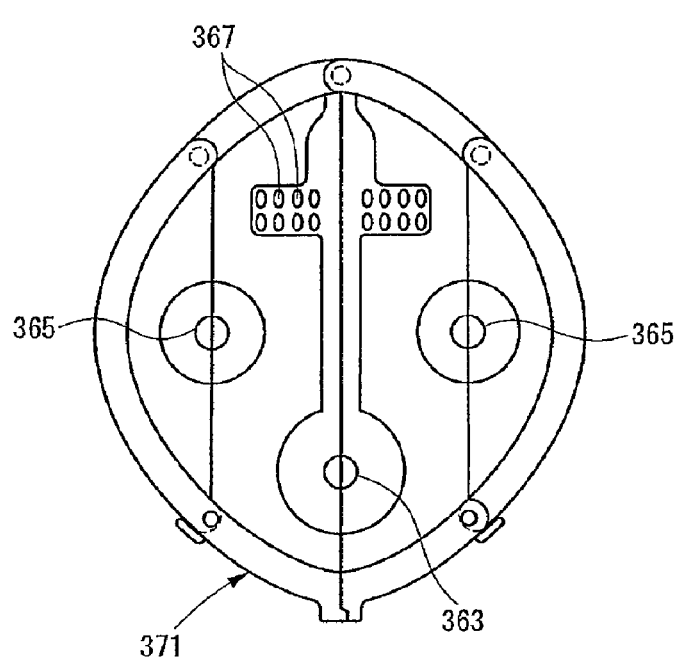
FIG. 31 is a front view of the sealing end face plate illustrated in FIG. 30.
Figure 32:
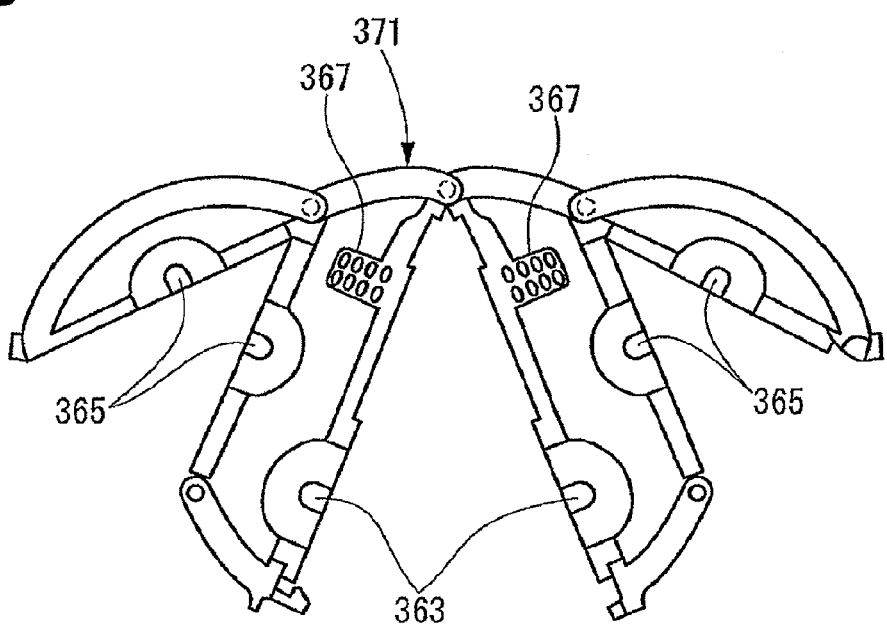
FIG. 32 is a front view of the sealing end face plate 371 illustrated in FIG. 31 in the state where the cable inserting sections for the main and branch cables are open.

101 . . . optical interconnection system; 102 . . . feeder cable (office-side optical cable); 103 . . . drop cable (subscriber-side optical cable); 104 . . . branch cable (first optical cable); 105 . . . sub-branch cable (second optical cable); 109 . . . 4-core coated optical fiber ribbon (first or second optical fiber); 115 . . . coated optical fiber (first or second optical fiber); 118 . . . feeder closure (office-side closure or optical cable connecting closure); 121 . . . case; 122 . . . module storing section; 123 . . . connecting module; 127 . . . module main body; 128 . . . MT connector (first connector); 129 . . . MT connector (second connector); 130 . . . optical connecting section; 132 . . . distribution closure (intermediate closure or optical cable connecting closure); 135 . . . case; 136 . . . module storing section; 137 . . . connecting module; 138 . . . connecting module; 142 . . . module main body; 143 . . . MT connector (first connector); 144 . . . single-core connector (second connector); 145 . . . optical connecting section; 147 . . . module main body; 148 . . . single-core connector (first connector); 149 . . . single-core connector (second connector); 150 . . . optical connecting section; 151 . . . optical splitter; 153 . . . connecting optical fiber (first or second optical fiber); 154 . . . drop closure (subscriber-side closure or optical cable connecting closure); 157 . . . case; 158 . . . connecting module; 159 . . . module storing section; 163 . . . module main body; 164 . . . single-core connector (first connector); 165 . . . single-core connector (second connector); 167 . . . optical connecting section; 170 . . . optical interconnection system; 171 . . . feeder closure (office-side closure or optical cable connecting closure); 172 . . . connecting module; 173 . . . module main body; 174 . . . MT connector (first connector); 175 . . . MT connector (second connector); 176 . . . optical connecting section; 178 . . . distribution closure (intermediate closure or optical cable connecting closure); 180 . . . optical interconnection system; 181 . . . drop closure (subscriber-side closure or optical cable connecting closure); 182 . . . connecting module; 183 . . . module main body; 184 . . . single-core connector (first connector); 185 . . . single-core connector (second connector); 186 . . . optical connecting section 201, 210, 230, 240 . . . optical cable connecting closure; 202 . . . main body section; 203 . . . splitter module section; 204 . . . guide section; 205 . . . input connector (first or third connector); 206 . . . coated optical fiber (first coated optical fiber); 207 . . . output connector (second or third connector); 217 . . . output connector (second connector); 208 . . . coated optical fiber (second or third coated optical fiber); 213 . . . branching coated fiber module section; 218 . . . drop cable (second coated optical fiber); G . . . rotary shaft; T0 . . . main cable (first optical cable); T1, T2 . . . branch cable (second optical cable)

303 . . . main cable; 305 . . . branch cable; 306 . . . aggregate drop cable; 311 . . . aggregate drop cable; 312 . . . support wire; 313 . . . single-core drop cable; 317 . . . aggregate drop cable; 319 . . . bind wire; 321 . . . waterproof tape; 323 . . . waterproof binding section; 325 . . . holding tape; 327 . . . holding binding section; 341 . . . cable leading-in/out section; 343 . . . insert nut; 363, 365, 367 . . . cable inserting section; 371 . . . sealing end face plate; 373 . . . cable holding device; 379, 380, 381 . . . sealing plate

The invention claimed is:

1. An optical cable connecting closure comprising:
a case having a module storing section; and
a connecting module, stored in the module storing section so as to be freely insertable therein and removable therefrom, for connecting first and second optical fibers to each other;
wherein the connecting module has a module main body, first and second connectors attached to the module main body and respectively connected to the first and second optical fibers, and an optical connecting section, provided in the module main body, for connecting the first and second connectors to each other;
wherein the module storing section is constructed such as to be able to store a plurality of kinds of connecting modules having the same module main body structure and different connecting functions in optical connecting sections;
wherein a plurality of the connecting modules are stored in the module storing section;
wherein at least two of the connecting modules are connected in order; and
wherein the first and second connectors are provided at an end part of the module main body.

2. An optical cable connecting closure according to claim 1, wherein the optical connecting section is configured for at least one of the following: straightly connecting the first and second connectors to each other, connecting the first and second connectors to each other with a core number conversion, and connecting the first and second connectors to each other with optical branching.

3. An optical cable connecting closure according to claim 1, wherein the module storing section has a structure for storing the connecting module vertically with respect to the case such that the first and second connectors face the front side of the case.

4. An optical cable connecting closure according to claim 1, wherein the first connector is provided at one end part of the module main body, while the second connector is provided at the other end part of the module main body; and
wherein the module storing section has such a structure as to store the connecting module vertically with respect to the case such that the first and second connectors face left and right sides with respect to the front side of the case.

5. An optical interconnection system for aerial optical interconnection between an office-side optical cable and a subscriber-side optical cable, the system comprising:
a first optical cable connected to the office-side optical cable;
a second optical cable connected to the subscriber-side optical cable;

an office-side closure connecting the office-side optical cable and the first optical cable to each other;

a subscriber-side closure for connecting the subscriber-side optical cable and the second optical cable to each other; and an intermediate closure for connecting the first and second optical cables to each other;

wherein the office-side closure, subscriber-side closure, and intermediate closure are each constituted by the optical cable connecting closure according to claim 1 and have respective kinds of connecting modules different from each other.

6. An optical cable connecting closure used for connecting a first coated optical fiber in a first optical cable and a second coated optical fiber in a second optical cable to each other, the optical cable connecting closure comprising:

a splitter module section for optically splitting;

a branching coated fiber module section for multicore/single-core-converting; and a main body section for storing the module section, wherein the module section is provided with a first connector for connecting with the first coated optical fiber and a second connector for connecting with the second coated optical fiber, wherein the first coated optical fiber, the second coated optical fiber, the splitter module section, and the branching coated fiber module section are connected in the order of the first coated optical fiber, then the first connector, then the branching coated fiber module section, then the splitter module section, then the second connector and then the second coated optical fiber.

7. An optical cable connecting closure according to claim 6, wherein the splitter module section and branching coated fiber module section have respective outer forms identical to each other.

8. An optical cable connecting closure according to claim 6, wherein the module section is arranged so as to be stacked.

9. An optical cable connecting closure according to claim 6, wherein the module section is arranged so as to be rotatable about a rotary axis provided near the first connector.

10. An optical cable connecting closure according to claim 6, further comprising a comb-toothed guide section, provided within the main body section, for guiding the second coated optical fiber.

11. An optical cable connecting closure used for connecting a first coated optical fiber in a first optical cable and a second coated optical fiber in a second optical cable to each other, the optical cable connecting closure comprising:

a splitter module section for optically splitting;

a branching coated fiber module section for multicore/single-core-converting; and a main body section for storing the module sections, wherein the branching coated fiber module section is provided with a first connector for connecting with the first coated optical fiber, wherein the splitter module section is provided with a second connector for connecting with the second coated optical fiber, wherein each of the splitter module section and branching coated fiber module section is provided with a third connector for connecting with a third coated optical fiber for connecting the splitter module section and branching coated fiber module section to each other, and wherein the first coated optical fiber, the second coated optical fiber, the third coated optical fiber, the splitter module section and the branching coated fiber module section are connected in the order of the first coated optical fiber, then the first connector, then the branching coated fiber module section, then the third connector, then the third coated optical fiber, then the third connector, then the splitter module section, then the second connector and then the second coated optical fiber.

* * * * *